US009447335B2

(12) United States Patent
Abai et al.

(10) Patent No.: US 9,447,335 B2
(45) Date of Patent: Sep. 20, 2016

(54) PROCESS FOR REMOVING METALS FROM HYDROCARBONS

(75) Inventors: Mahpuzah Abai, Belfast (GB); Martin P. Atkins, Belfast (GB); Kuah Y. Cheun, Belfast (GB); John Holbrey, Belfast (GB); Peter Nockemann, Belfast (GB); Ken Seddon, Belfast (GB); Geetha Srinivasan, Belfast (GB); Yiran Zou, Belfast (GB)

(73) Assignee: The Queen's University of Belfast, Belfast (GB)

( * ) Notice: Subject to any disclaimer, the term of this patent is extended or adjusted under 35 U.S.C. 154(b) by 520 days.

(21) Appl. No.: 13/877,706

(22) PCT Filed: Oct. 5, 2011

(86) PCT No.: PCT/GB2011/051906
§ 371 (c)(1),
(2), (4) Date: Sep. 23, 2013

(87) PCT Pub. No.: WO2012/046057
PCT Pub. Date: Apr. 12, 2012

(65) Prior Publication Data
US 2014/0001100 A1    Jan. 2, 2014

(30) Foreign Application Priority Data

Oct. 5, 2010  (GB) .................................. 1016751.8

(51) Int. Cl.
*C10G 21/06*  (2006.01)
*C10G 21/20*  (2006.01)
(Continued)

(52) U.S. Cl.
CPC ............... *C10G 21/24* (2013.01); *C10G 21/06* (2013.01); *C10G 21/20* (2013.01); *C10G 21/22* (2013.01);
(Continued)

(58) Field of Classification Search
CPC .......... B01D 2252/30; B01D 2256/24; B01D 2257/602; C10G 21/06; C10G 21/20; C10G 21/22; C10G 21/24; C10G 2300/1025; C10G 2300/104; C10G 2300/1044; C10G 2300/1051; C10G 2300/1055; C10G 2300/205; C10G 2400/02; C10G 2400/04; C10G 2400/08; C10G 29/06; C10L 3/101
See application file for complete search history.

(56) References Cited

U.S. PATENT DOCUMENTS 4,359,596 A    11/1982  Howard et al. ............... 585/856
7,553,406 B2*  6/2009  Wasserscheid ......... C07B 63/00
                                                     208/236
(Continued)

FOREIGN PATENT DOCUMENTS

EP    0 325 486 A2    1/1989    ............. C10G 29/06
EP    0 352 420 A1    5/1989    ............. C10G 29/10
(Continued)

OTHER PUBLICATIONS

N. S. Bloom "Analysis and stability of mercury speciation in petroleum hydrocarbons" *Fresenius J Anal Chem* (2000) 366:438-443.
(Continued)

*Primary Examiner* — Renee E Robinson
*Assistant Examiner* — Derek Mueller
(74) *Attorney, Agent, or Firm* — Ryan T. Grace; Advent, LLP

(57) ABSTRACT

The present invention relates to a process for the removal of mercury from a mercury-containing hydrocarbon fluid feed using specifically selected ionic liquids comprising, contacting the mercury-containing hydrocarbon fluid feed with an ionic liquid having the formula [Cat$^+$][M$^+$][X$^-$] and separating from the ionic liquid a hydrocarbon fluid product having a reduced mercury content compared to the mercury-containing fluid feed.

31 Claims, 2 Drawing Sheets

(51) Int. Cl.
  *C10G 21/22* (2006.01)
  *C10G 29/06* (2006.01)
  *C10G 21/24* (2006.01)
  *C10L 3/10* (2006.01)

(52) U.S. Cl.
  CPC ........... *C10G 29/06* (2013.01); *C10L 3/101* (2013.01); *B01D 2252/30* (2013.01); *B01D 2256/24* (2013.01); *B01D 2257/602* (2013.01); *C10G 2300/104* (2013.01); *C10G 2300/1025* (2013.01); *C10G 2300/1044* (2013.01); *C10G 2300/1051* (2013.01); *C10G 2300/1055* (2013.01); *C10G 2300/205* (2013.01); *C10G 2400/02* (2013.01); *C10G 2400/04* (2013.01); *C10G 2400/08* (2013.01)

(56) References Cited

U.S. PATENT DOCUMENTS

| 2003/0104937 | A1 | 6/2003  | Sinha              | 502/400 |
| 2003/0125599 | A1 | 7/2003  | Boudreau et al.    | 585/809 |
| 2007/0119300 | A1 | 5/2007  | Yang et al.        | 95/107  |
| 2007/0123660 | A1 | 5/2007  | deGouvea-Pinto et al. | 525/342 |
| 2010/0317509 | A1 | 12/2010 | Wang               | 502/62  |
| 2011/0123422 | A1 | 5/2011  | Wang               | 423/240 |

FOREIGN PATENT DOCUMENTS

| EP | 0 385 742   | A1 | 2/1990  | ............ C10G 25/00 |
| EP | 0 480 603   | A2 | 9/1991  | ............ C10G 29/10 |
| GB | 2 027 049   | A  | 2/1980  | ............ C10G 27/06 |
| JP | 59010343    | A  | 1/1984  | ............ B01J 20/02 |
| WO | 98/06106    | A2 | 2/1998  | ............ G21F 9/28  |
| WO | 2006/072775 | A2 | 7/2006  |                         |
| WO | 2007/138307 | A2 | 12/2007 | ............ C10G 21/27 |
| WO | 2010/116165 | A2 | 10/2010 | ............ C10G 21/27 |
| WO | 2010/147781 | A1 | 12/2010 | ............ B01D 53/02 |

OTHER PUBLICATIONS

Pitner et al. "Ionic Liquids in the Nuclear Industry/Solutions for the Nuclear Fuel Cycle", *Green Industrial Applications of Ionic Liquids*, 209-226.

Ji et al. "Pyrrolidinium Imides: Promising Ionic Liquids for Direct Capture of Elemental Mercury from Flue Gas" *Water Air Soil Pollut*: Focus (2008) 8:349-358.

Ji et al. "Room Temperature Ionic Liquids for Mercury Capture from Flue Gas" *Ind. Eng. Chem Res*. 2008, 47, 8396-8400.

Rogers et al. "Mercury partitioning from aqueous solutions with a new hydrophobic ethylene-glycol functionalized bis-imidazolium ionic liquid" *Green Chemistry*, 2003, 5, 129-135.

Prausnitz et al. "Selective Extraction of Copper, Mercury, Silver, and Palladium Ions from Water Using Hydrophobic Ionic Liquids" *Ind. Eng. Chem Res*. 2008, 47, 5080-5086.

Peise et al. "New adsorbents for direct warm-gas capture of mercury" *Main Group Chemistry* vol. 7, No. 3, Sep. 2008, 181-189.

International Search Report dated Aug. 24, 2012, Application No. PCT/GB2011/051906.

UKIPO Search Report dated Oct. 6, 2011, Application No. GB1016751.8.

UKIPO Search Report dated Feb. 3, 2011, Application No. GB1016751.8.

\* cited by examiner

PROCESS FOR REMOVING METALS FROM HYDROCARBONS

This invention relates to a process for removing metals, and particularly mercury, from hydrocarbon fluids. More specifically, the invention relates to a process wherein metals are extracted from gaseous or liquid hydrocarbons using an ionic liquid.

Liquid and gaseous hydrocarbons obtained from oil and gas fields are often contaminated with mercury. In particular, liquid and gaseous hydrocarbons obtained from oil and gas fields in and around the Netherlands, Germany, Canada, USA, Malaysia, Brunei and the UK are known to contain mercury. As reported by N. S. Bloom (Fresenius J. Anal. Chem., 2000, 366, 438-443), the mercury content of such hydrocarbons may take a variety of forms. Although elemental mercury tends to predominate, particulate mercury (i.e. mercury bound to particulate matter), organic mercury (e.g. dimethylmercury and diethylmercury) and ionic mercury (e.g. mercury dichloride) may also be found in naturally occurring hydrocarbon sources. The mercury concentration in crude oils can range from below 1 part per billion (ppb) to several thousand ppb depending on the well and location. Similarly, mercury concentrations in natural gas can range from below 1 $ng \cdot m^{-3}$ to greater than 1000 $\mu g \cdot m^{-3}$.

The presence of mercury in hydrocarbons is problematic due to its toxicity. In addition, mercury is corrosive towards hydrocarbon processing equipment, such as that used in oil and gas refineries. Mercury can react with aluminium components of hydrocarbon processing equipment to form an amalgam, which can lead to equipment failure. For example, pipeline welds, cryogenic components, aluminium heat exchangers and hydrogenation catalysts can all be damaged by hydrocarbons contaminated with mercury. This can lead to plant shutdown, with severe economic implications, or, in extreme cases, to uncontrolled loss of containment or complete plant failure, with potentially catastrophic results. Furthermore, products with high levels of mercury contamination are considered to be of poorer quality, with the result that they command a lower price.

A number of approaches to the removal of mercury from hydrocarbons have been proposed. These include: scrubbing techniques using fixed bed columns containing sulfur, transition metal or heavy metal sulfides and iodides on an activated support; reduction of inorganic and organomercury to elemental forms followed by scrubbing or amalgamation; oxidation followed by complexation with sulfur-containing compounds; and oxidation followed by solvent extraction. However, there remains a need in the art for more effective methods for the removal of mercury from hydrocarbons, such as crude oil distillates and natural gas, particularly to remove 'total' mercury from hydrocarbon sources containing two or more forms of mercury.

The term "ionic liquid" as used herein refers to a liquid that is capable of being produced by melting a salt, and when so produced consists solely of ions. An ionic liquid may be formed from a homogeneous substance comprising one species of cation and one species of anion, or it can be composed of more than one species of cation and/or more than one species of anion. Thus, an ionic liquid may be composed of more than one species of cation and one species of anion. An ionic liquid may further be composed of one species of cation, and one or more species of anion. Still further, an ionic liquid may be composed of more than one species of cation and more than one species of anion.

The term "ionic liquid" includes compounds having both high melting points and compounds having low melting points, e.g. at or below room temperature. Thus, many ionic liquids have melting points below 200° C., particularly below 100° C., around room temperature (15 to 30° C.), or even below 0° C. Ionic liquids having melting points below around 30° C. are commonly referred to as "room temperature ionic liquids" and are often derived from organic salts having nitrogen-containing heterocyclic cations, such as imidazolium and pyridinium-based cations. In room temperature ionic liquids, the structures of the cation and anion prevent the formation of an ordered crystalline structure and therefore the salt is liquid at room temperature.

Ionic liquids are most widely known as solvents. Many ionic liquids have been shown to have negligible vapour pressure, temperature stability, low flammability and recyclability. Due to the vast number of anion/cation combinations that are available it is possible to fine-tune the physical properties of the ionic liquid (e.g. melting point, density, viscosity, and miscibility with water or organic solvents) to suit the requirements of a particular application.

There are a limited number of reports available which examine the partitioning of metals into ionic liquids from inorganic systems.

For example, the partitioning of mercury ions, in the high 2+ oxidation state, into ionic liquids from water has been reported by Rogers, et al. (*Green Chem.,* 2003, 5, 129-135), who showed that dicationic anionic liquid complexants can be used to partition Hg(II) from aqueous salt and acid solutions. Prausnitz, et al. (*Ind. Eng. Chem. Res.,* 2008, 47, 5080-5086) have shown that mercuric ions partition preferentially from water into hydrophobic ionic liquids.

Pinto et al. (US Patent Application 2007/0123660) have shown that the combination of metal-complexing ligands and ionic liquids coated onto an inert support may be used as an adsorbent to remove mercury from coal combustion flue gases (see also Ji et al., *Water, Air, & Soil Pollution: Focus* 2008, 8, 349-358, *Ind. Eng. Chem. Res.,* 2008, 47, 8396-8400, and *Main Group Chemistry* 2008, 7, 181-189)

In WO 98/06106, a process is disclosed for the oxidative dissolution of nuclear fuels and nuclear fuel-cladding materials in nitrate-based ionic liquids. The ionic liquids disclosed comprise nitrate anions, and optionally sulphate or tetrafluoroborate anions, and a Bronsted or Franklin acid (such as nitric acid, sulphuric acid, or nitronium cations) which is necessary to increase the oxidising power of the solvent. The ionic liquids disclosed are all water soluble.

Pitner, W. R. et al. have described a similar process for dissolving insoluble uranium oxide ($UO_2$) in which the uranium oxide is oxidised to the soluble species $UO_2^{2+}$ in a mixture of nitric acid and an ionic liquid comprising nitrate anions (in *Green Industrial Applications of Ionic Liquids*, NATO Science Series II: *Mathematics, Physics and Chemistry*, 2003, 92, 209-226, Kluwer Academic Publishers, Dordrecht.). The dissolution of elemental metals is not described, however.

It will be appreciated that the oxidation processes disclosed in WO 98/06106 and in Pitner et al. require the use of highly corrosive acids containing nitronium ions. Such processes are self-evidently incompatible with hydrocarbon processing since hydrocarbon components such as olefins and aromatic compounds are susceptible to reaction with acids and nitronium ions, forming unwanted by-products. The use of acids also leads to an undesirable increase in the overall acidity of the compositions, especially with respect to hydrocarbon fluids. Furthermore, the high corrosivity of the systems disclosed in WO 98/06106 and in Pitner et al.

makes them incompatible with metal hydrocarbon processing, storage and transportation apparatus.

The present invention is based on the surprising finding that certain metal-containing ionic liquids are capable of extracting elemental, ionic and organic forms of mercury from hydrocarbon fluids with high levels of efficiency. It has been found that the ionic liquids have very high capacities for dissolved mercury, for instance the capacity for dissolved mercury in the ionic liquid may be as high as 20 wt %, based on the total weight of ionic liquid and mercury.

In a first aspect, the present invention provides a process for the removal of mercury from a mercury-containing hydrocarbon fluid feed, the process comprising the steps of:
(i) contacting the mercury-containing hydrocarbon fluid feed with an ionic liquid having the formula:

$$[Cat^+][M^+][X^-]$$

wherein: [Cat$^+$] represents one or more organic cationic species,
[M$^+$] represents one or more metal cations selected from transition metal cations having an oxidation state of +2 or greater,
[X$^-$] represents one or more anionic species; and
(ii) separating from the ionic liquid a hydrocarbon fluid product having a reduced mercury content compared to the mercury-containing fluid feed.

Without being bound by any particular theory, it is believed that the ionic liquids provide a mildly oxidising environment in which elemental mercury is oxidised to highly soluble ionic mercury species, and in which organomercury species undergo oxidative cleavage to form highly soluble mercury ions. The mercury ions thus formed are believed to partition with high selectivity from hydrocarbon fluids into the ionic liquids. Thus, the ionic liquids of the present invention perform the dual function of oxidising mercury and providing a capture medium for oxidised mercury species. This enables mercury of all speciation types to be removed from hydrocarbon fluids with high efficiency.

The ionic liquids used in the processes of the present invention are sufficiently mild that reaction of the ionic liquid with the hydrocarbon fluid and/or the hydrocarbon processing/transportation/storage apparatus is avoided. In this regard, it will be appreciated that the process of the present invention does not require the use of corrosive acidic and/or nitrating media (e.g. ionic liquids containing sulfuric acid, nitric acid, nitronium ions, and/or hydrogen sulfate anions) which are incompatible with the processing of hydrocarbon materials.

In a preferred embodiment, [M$^+$] may represent one or more metal cations selected from first row transition metal cations having an oxidation state of at least +2, i.e. metal cations selected from scandium, titanium, vanadium, chromium, manganese, iron, cobalt, nickel, copper and zinc and having an oxidation state of at least +2.

Thus, in accordance with the present invention [M$^+$] may represent one or more metal cations selected from Sc$^{2+}$, Sc$^{3+}$, Ti$^{2+}$, Ti$^{3+}$, Ti$^{4+}$, V$^{2+}$, V$^{3+}$, V$^{4+}$, V$^{5+}$, Cr$^{2+}$, Cr$^{3+}$, Cr$^{4+}$, Cr$^{5+}$, Cr$^{6+}$, Mn$^{2+}$, Mn$^{3+}$, Mn$^{4+}$, Mn$^{5+}$, Mn$^{6+}$, Mn$^{7+}$, Fe$^{2+}$, Fe$^{3+}$, Fe$^{4+}$, Fe$^{5+}$, Fe$^{6+}$, Co$^{2+}$, Co$^{3+}$, Co$^{4+}$, Co$^{5+}$, Ni$^{2+}$, Ni$^{3+}$, Ni$^{4+}$, Zn$^{2+}$, Mo$^{2+}$, Mo$^{3+}$, Mo$^{4+}$, Mo$^{5+}$ and/or Mo$^{6+}$.

In a further preferred embodiment, [M$^+$] may represent a iron cation having an oxidation state of at least +2, i.e. selected from Fe$^{2+}$, Fe$^{3+}$, Fe$^{4+}$, Fe$^{5+}$ and/or Fe$^{6+}$. More preferably, [M$^+$] may represent Fe$^{3+}$.

In a further preferred embodiment, [M$^+$] may represent a copper cation having an oxidation state of at least +2, i.e. selected from Cu$^{2+}$, Cu$^{3+}$ and/or Cu$^{4+}$. More preferably, [M$^+$] may represent Cu$^{2+}$.

In a further preferred embodiment, [M$^+$] may represent a molybdenum cation having an oxidation state of at least +2, i.e. selected from Mo$^{2+}$, Mo$^{3+}$, Mo$^{4+}$, Mo$^{5+}$ and/or Mo$^{6+}$. More preferably, [M$^+$] may represent Mo$^{6+}$.

In a further preferred embodiment, [M$^+$] may represent a cobalt cation having an oxidation state of at least +2, i.e. selected from Co$^{2+}$, Co$^{3+}$, Co$^{4+}$ and/or Co$^{5+}$. More preferably, [M$^+$] may represent Co$^{2+}$.

It will also be appreciated that, in certain embodiments, [M$^+$] may represent more than one metal cation. For instance, [M$^+$] may represent more than one metal cation (i.e. a mixture of cations of different metals, and/or a mixture of cations of the same metal and having different oxidation states) selected from the preferred groups of cations disclosed above.

In particularly preferred embodiments, [M$^+$] represents one or more metal cations selected from Fe$^{3+}$, Cu$^{2+}$, Mo$^{6+}$, and Co$^{2+}$. More preferably, [M$^+$] represents one or more metal cations selected from Fe$^{3+}$ and Cu$^{2+}$.

In a particularly preferred embodiment, [M$^+$] represents Fe$^{3+}$.

In a further particularly preferred embodiment, [M$^+$] represents Cu$^{2+}$.

One advantage of using one or more metal ions having an oxidation state of at least +2 is that reduction of the metal ion during the oxidation of mercury generally leads to the formation of a metal ion having an oxidation state of at least +1, thus avoiding the formation of elemental metals as a by-product.

Preferably, the metal ion is selected so as to have an oxidation state of at least +1 following mercury oxidation (for example Cu$^{2+}$ is reduced to Cu$^+$). In this way, the mercury-containing hydrocarbon fluids that can be processed according to the present invention may comprise from 1 part per billion (ppb) of mercury to in excess of 250,000 ppb of mercury, for instance 1 to 200,000 ppb of mercury, 1 to 100,000 ppb of mercury, 1 to 50,000 ppb of mercury, 2 to 10,000 ppb of mercury, or 5 to 1000 ppb of mercury.

The mercury content of naturally occurring hydrocarbon fluids may take a variety of forms, and the present invention can be applied to the removal of elemental mercury, particulate mercury, organic mercury or ionic mercury from hydrocarbon fluids. In one preferred embodiment, the hydrocarbon fluid feed comprises at least one of elemental mercury, particulate mercury, or organic mercury. Still more preferably, the hydrocarbon fluid feed comprises at least one of elemental mercury and organic mercury. Thus, in one preferred embodiment, the hydrocarbon fluid feed comprises elemental mercury. In a further preferred embodiment, the hydrocarbon fluid feed comprises organic mercury.

The processes of the present invention are particularly suitable for extracting mercury from hydrocarbon fluids containing more than one type of mercury speciation, for example two or more types of mercury speciation. In preferred embodiments of the invention, the hydrocarbon fluid may comprise:
(i) elemental mercury and inorganic mercury;
(ii) elemental mercury and organic mercury;
(iii) inorganic mercury and organic mercury; or
(iv) all three of elemental, inorganic and organic mercury.

The processes of the invention may be used with substantially any hydrocarbon feed which comprises mercury, and which is liquid or gaseous under the operating conditions of the process.

As used herein, the term "hydrocarbon" refers to a liquid or gaseous substance containing at least 50 weight percent hydrocarbons, more preferably at least 60 weight percent hydrocarbons, more preferably at least 70 weight percent hydrocarbons, still more preferably at least 80 weight percent hydrocarbons, still more preferably at least 90 weight percent hydrocarbons, and most preferably at least 95 weight percent hydrocarbons.

Examples of hydrocarbon fluids that may be processed according to the present invention include liquid hydrocarbons, such as liquefied natural gas; light distillates, e.g. comprising liquid petroleum gas, gasoline, and/or naphtha; natural gas condensates; middle distillates, e.g. comprising kerosene and/or diesel; heavy distillates, e.g. fuel oil; and crude oils. Hydrocarbon fluids that may be processed according to the present invention also include gaseous hydrocarbons, such as natural gas and refinery gas.

In accordance with the present invention, [Cat$^+$] may comprise a cationic species selected from: ammonium, benzimidazolium, benzofuranium, benzothiophenium, benzotriazolium, borolium, cinnolinium, diazabicyclodecenium, diazabicyclononenium, 1,4-diazabicyclo[2.2.2]octanium, diazabicyclo-undecenium, dithiazolium, furanium, guanidinium, imidazolium, indazolium, indolinium, indolium, morpholinium, oxaborolium, oxaphospholium, oxazinium, oxazolium, iso-oxazolium, oxothiazolium, phospholium, phosphonium, phthalazinium, piperazinium, piperidinium, pyranium, pyrazinium, pyrazolium, pyridazinium, pyridinium, pyrimidinium, pyrrolidinium, pyrrolium, quinazolinium, quinolinium, iso-quinolinium, quinoxalinium, quinuclidinium, selenazolium, sulfonium, tetrazolium, thiadiazolium, iso-thiadiazolium, thiazinium, thiazolium, iso-thiazolium, thiophenium, thiuronium, triazinium, triazolium, iso-triazolium, and uronium.

In one preferred embodiment of the invention, [Cat$^+$] comprises an aromatic heterocyclic cationic species selected from: benzimidazolium, benzofuranium, benzothiophenium, benzotriazolium, cinnolinium, diazabicyclodecenium, diazabicyclononenium, diazabicyclo-undecenium, dithiazolium, imidazolium, indazolium, indolinium, indolium, oxazinium, oxazolium, iso-oxazolium, oxathiazolium, phthalazinium, pyrazinium, pyrazolium, pyridazinium, pyridinium, pyrimidinium, quinazolinium, quinolinium, iso-quinolinium, quinoxalinium, tetrazolium, thiadiazolium, iso-thiadiazolium, thiazinium, thiazolium, iso-thiazolium, triazinium, triazolium, and iso-triazolium.

More preferably, [Cat$^+$] has the formula:

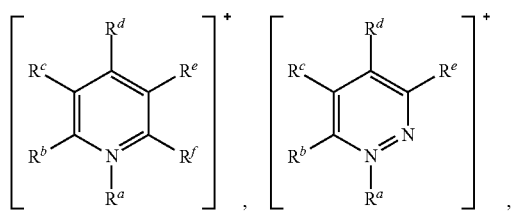

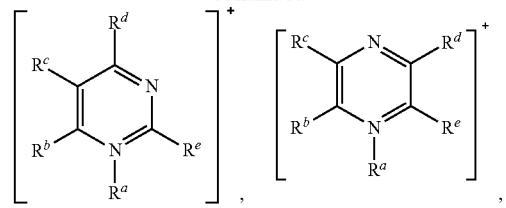

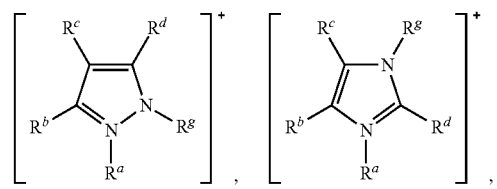

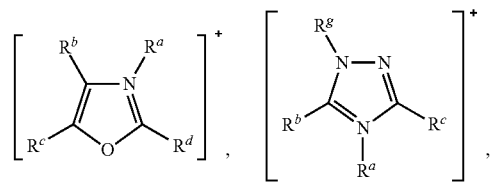

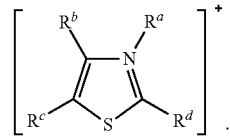

wherein: $R^a$, $R^b$, $R^c$, $R^d$, $R^e$, $R^f$ and $R^g$ are each independently selected from hydrogen, a $C_1$ to $C_{20}$, straight chain or branched alkyl group, a $C_3$ to $C_8$ cycloalkyl group, or a $C_6$ to $C_{10}$ aryl group, or any two of $R^b$, $R^c$, $R^d$, $R^e$ and $R^f$ attached to adjacent carbon atoms form a methylene chain —(CH$_2$)$_q$— wherein q is from 3 to 6; and wherein said alkyl, cycloalkyl or aryl groups or said methylene chain are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, $C_7$ to $C_{10}$ alkaryl, $C_7$ to $C_{10}$ aralkyl, —CN, —OH, —SH, —NO$_2$, —CO$_2$R$^x$, —OC(O)R$^x$, —C(O)R$^x$, —C(S)R$^x$, —CS$_2$R$^x$, —SC(S)R$^x$, —S(O)(C$_1$ to C$_6$)alkyl, —S(O)O(C$_1$ to C$_6$)alkyl, —OS(O)(C$_1$ to C$_6$)alkyl, —S(C$_1$ to C$_6$)alkyl, —S—S(C$_1$ to C$_6$ alkyl), —NR$^x$C(O)NR$^y$R$^z$, —NR$^x$C(O)OR$^y$, —OC(O)NR$^y$R$^z$, —NR$^x$C(S)OR$^y$, —OC(S)NR$^y$R$^z$, —NR$^x$C(S)SR$^y$, —SC(S)NR$^y$R$^z$, —NR$^x$C(S)NR$^y$R$^z$, —C(O)NR$^y$R$^z$, —C(S)NR$^y$R$^z$, —NR$^y$R$^z$, or a heterocyclic group, wherein R$^x$, R$^y$ and R$^z$ are independently selected from hydrogen or $C_1$ to $C_6$ alkyl.

$R^a$ is preferably selected from $C_1$ to $C_{15}$, linear or branched, alkyl, more preferably $C_2$ to $C_{10}$ linear or branched alkyl, still more preferably, $C_2$ to $C_8$ linear or branched alkyl, and most preferably $C_4$ to $C_8$ linear or branched alkyl. Further examples include wherein $R^a$ is selected from methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl and n-octadecyl.

In the cations comprising an $R^g$ group, $R^g$ is preferably selected from $C_1$ to $C_{10}$ linear or branched alkyl, more preferably, $C_1$ to $C_5$ linear or branched alkyl, and most preferably $R^g$ is a methyl group.

In the cations comprising both an $R^a$ and an $R^g$ group, $R^a$ and $R^g$ are each preferably independently selected from $C_1$ to $C_{20}$, linear or branched, alkyl, and one of $R^a$ and $R^g$ may also be hydrogen. More preferably, one of $R^a$ and $R^g$ may be selected from $C_2$ to $C_{10}$ linear or branched alkyl, still more preferably, $C_2$ to $C_8$ linear or branched alkyl, and most preferably $C_4$ to $C_8$ linear or branched alkyl, and the other one of $R^a$ and $R^g$ may be selected from $C_1$ to $C_{10}$ linear or branched alkyl, more preferably, $C_1$ to $C_5$ linear or branched alkyl, and most preferably a methyl group. In a further preferred embodiment, $R^a$ and $R^g$ may each be independently selected, where present, from $C_1$ to $C_{20}$ linear or branched alkyl and $C_1$ to $C_{15}$ alkoxyalkyl.

In a further preferred embodiment, one of $R^a$ and $R^g$ may be substituted with hydroxy, methoxy or ethoxy.

In further preferred embodiments, $R^b$, $R^c$, $R^d$, $R^e$, and $R^f$ are independently selected from hydrogen and $C_1$ to $C_5$ linear or branched alkyl, and more preferably $R^b$, $R^c$, $R^d$, $R^e$, and $R^f$ are each hydrogen.

In this embodiment of the invention, [Cat$^+$] preferably comprises a cation selected from:

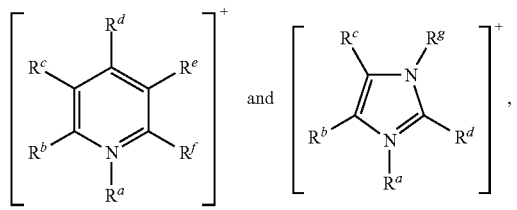

wherein: $R^a$, $R^b$, $R^c$, $R^d$, $R^e$, $R^f$, and $R^g$ are as defined above.

Still more preferably, [Cat$^+$] preferably comprises a cation selected from:

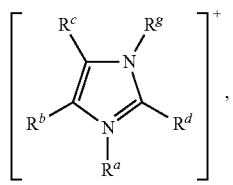

wherein: $R^a$, $R^b$, $R^c$, $R^d$, $R^e$, $R^f$, and $R^g$ are as defined above.

Preferably, [Cat$^+$] comprises a cation selected from:

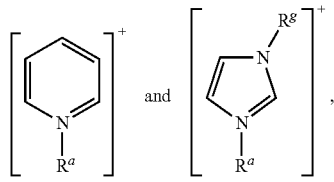

wherein: $R^a$ and $R^g$ are as defined above.

More preferably, [Cat$^+$] comprises a cation selected from:

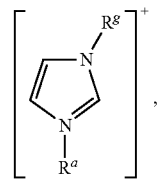

wherein: $R^a$ and $R^g$ are as defined above.

Specific examples of preferred nitrogen-containing aromatic heterocyclic cations that may be used according to the present invention include:

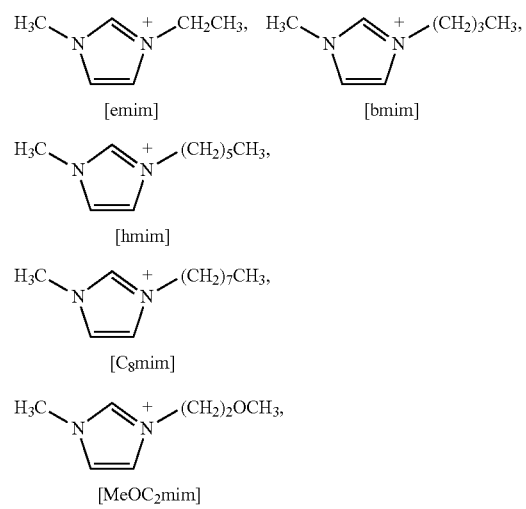

In another preferred embodiment of the invention, [Cat$^+$] comprises a saturated heterocyclic cation selected from cyclic ammonium, 1,4-diazabicyclo[2.2.2]octanium, morpholinium, cyclic phosphonium, piperazinium, piperidinium, quinuclidinium, and cyclic sulfonium.

More preferably, [Cat$^+$] comprises a saturated heterocyclic cation having the formula:

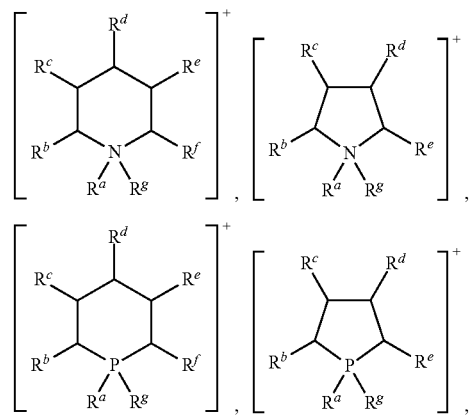

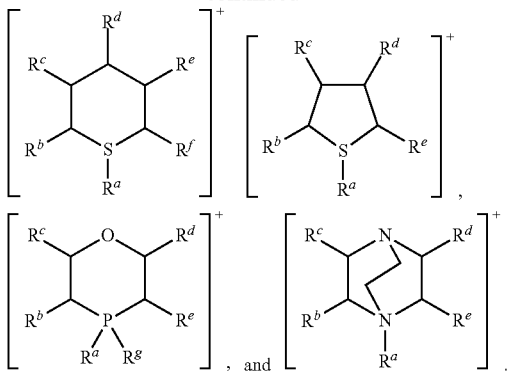

wherein: $R^a$, $R^b$, $R^c$, $R^d$, $R^e$, $R^f$, and $R^g$ are as defined above.

Still more preferably, [Cat$^+$] comprises a saturated heterocyclic cation having the formula:

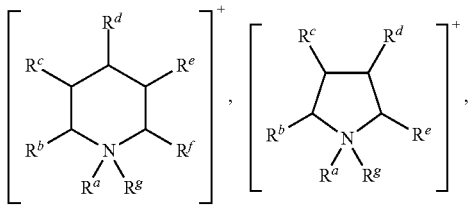

and is most preferably:

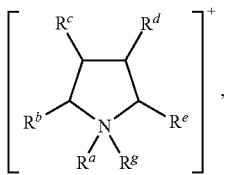

wherein: $R^a$, $R^b$, $R^c$, $R^d$, $R^e$, $R^f$, and $R^g$ are as defined above.

Also in accordance with this embodiment of the invention, [Cat$^+$] may preferably comprise a saturated heterocyclic cation selected from:

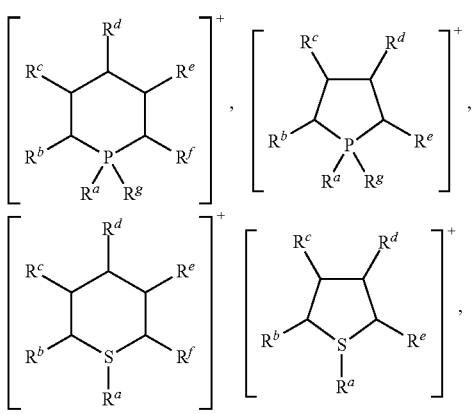

In the saturated heterocyclic cations defined above, $R^a$ is preferably selected from $C_1$ to $C_{15}$, linear or branched, alkyl, more preferably $C_2$ to $C_{10}$ linear or branched alkyl, still more preferably, $C_2$ to $C_8$ linear or branched alkyl, and most preferably $C_4$ to $C_8$ linear or branched alkyl. Further examples include wherein $R^a$ is selected from methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl and n-octadecyl.

In the cations comprising an $R^g$ group, $R^g$ is preferably selected from $C_1$ to $C_{10}$ linear or branched alkyl, more preferably, $C_1$ to $C_5$ linear or branched alkyl, and most preferably $R^g$ is a methyl group.

In the saturated heterocyclic cations comprising both an $R^a$ and an $R^g$ group, $R^a$ and $R^g$ are each preferably independently selected from $C_1$ to $C_{20}$, linear or branched, alkyl, and one of $R^a$ and $R^g$ may also be hydrogen. More preferably, one of $R^a$ and $R^g$ may be selected from $C_2$ to $C_{10}$ linear or branched alkyl, still more preferably, $C_2$ to $C_8$ linear or branched alkyl, and most preferably $C_4$ to $C_8$ linear or branched alkyl, and the other one of $R^a$ and $R^g$ may be selected from $C_1$ to $C_{10}$ linear or branched alkyl, more preferably, $C_1$ to $C_5$ linear or branched alkyl, and most preferably a methyl group. In a further preferred embodiment, $R^a$ and $R^g$ may each be independently selected, where present, from $C_1$ to $C_{20}$ linear or branched alkyl and $C_1$ to $C_{15}$ alkoxyalkyl.

In further preferred embodiments, $R^b$, $R^c$, $R^d$, $R^e$, and $R^f$ are independently selected from hydrogen and $C_1$ to $C_5$ linear or branched alkyl, and more preferably $R^b$, $R^c$, $R^d$, $R^e$, and $R^f$ are each hydrogen.

In a further preferred embodiment, $R^a$ may be substituted with hydroxy, methoxy or ethoxy.

In another preferred embodiment of the invention, [Cat$^+$] comprises an acyclic cation selected from:

$[N(R^a)(R^b)(R^c)(R^d)]^+$, $[P(R^a)(R^b)(R^c)(R^d)]^+$, and $[S(R^a)(R^b)(R^c)]^+$, wherein: $R^a$, $R^b$, $R^c$, and $R^d$ are each independently selected from a $C_1$ to $C_{20}$, straight chain or branched alkyl group, a $C_3$ to $C_8$ cycloalkyl group, or a $C_6$ to $C_{10}$ aryl group; and wherein said alkyl, cycloalkyl or aryl groups are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, $C_7$ to $C_{10}$ alkaryl, $C_7$ to $C_{10}$ aralkyl, —CN, —OH, —SH, —NO$_2$, —CO$_2$R$^x$, —OC(O)R$^x$, —C(O)R$^x$, —C(S)R$^x$, —CS$_2$R$^x$, —SC(S)R$^x$, —S(O)(C$_1$ to C$_6$)alkyl, —S(O)O(C$_1$ to C$_6$)alkyl, —OS(O)(C$_1$ to C$_6$)alkyl, —S(C$_1$ to C$_6$)alkyl, —S—S(C$_1$ to C$_6$ alkyl), —NR$^x$C(O)NR$^y$R$^z$, —NR$^x$C(O)OR$^y$, —OC(O)NR$^y$R$^z$, —NR$^x$C(S)OR$^y$, —OC(S)NR$^y$R$^z$, —NR$^x$C(S)SR$^y$, —SC(S)NR$^y$R$^z$, —NR$^x$C(S)NR$^y$R$^z$, —C(O)NR$^y$R$^z$, —C(S)NR$^y$R$^z$, —NR$^y$R$^z$, or a heterocyclic group, wherein R$^x$, R$^y$ and R$^z$ are independently selected from hydrogen or C$_1$ to C$_6$ alkyl and wherein one of R$^a$, R$^b$, R$^c$, and R$^d$ may also be hydrogen.

More preferably, [Cat⁺] comprises a cation selected from:

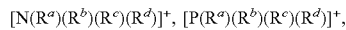

wherein: $R^a$, $R^b$, $R^c$, and $R^d$ are each independently selected from a $C_1$ to $C_{20}$ straight chain or branched alkyl group, a $C_3$ to $C_6$ cycloalkyl group, or a $C_6$ aryl group; and wherein said alkyl, cycloalkyl or aryl groups are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, $C_7$ to $C_{10}$ alkaryl, $C_7$ to $C_{10}$ aralkyl, —CN, —OH, —SH, —NO$_2$, —CO$_2$R$^x$, —OC(O)R$^x$, —C(O)R$^x$, —C(S)R$^x$, —CS$_2$R$^x$, —SC(S)R$^x$, —S(O)(C$_1$ to C$_6$)alkyl, —S(O)O(C$_1$ to C$_6$)alkyl, —OS(O)(C$_1$ to C$_6$)alkyl, —S(C$_1$ to C$_6$)alkyl, —S—S(C$_1$ to C$_6$ alkyl), —NR$^x$C(O)NR$^y$R$^z$, —NR$^x$C(O)OR$^y$, —OC(O)NR$^y$R$^z$, —NR$^x$C(S)OR$^y$, —OC(S)NR$^y$R$^z$, —NR$^x$C(S)SR$^y$, —SC(S)NR$^y$R$^z$, —NR$^x$C(S)NR$^y$R$^z$, —C(O)NR$^y$R$^z$, —C(S)NR$^y$R$^z$, —NR$^y$R$^z$, or a heterocyclic group, wherein $R^x$, $R^y$ and $R^z$ are independently selected from hydrogen or $C_1$ to $C_6$ alkyl and wherein one of $R^a$, $R^b$, $R^c$, and $R^d$ may also be hydrogen.

In the acyclic cations defined above, $R^a$ is preferably selected from $C_1$ to $C_{20}$, linear or branched, alkyl, more preferably $C_2$ to $C_{16}$ linear or branched alkyl, and most preferably $C_4$ to $C_{14}$ linear or branched alkyl. Further examples include wherein $R^a$ is selected from methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl and n-octadecyl.

In the acyclic cations defined above, $R^b$, $R^c$ and $R^d$ are preferably independently selected from $C_1$ to $C_{10}$ linear or branched alkyl, more preferably, $C_1$ to $C_5$ linear or branched alkyl.

Preferably two of $R^b$, $R^c$ and $R^d$, and more preferably each of $R^b$, $R^c$ and $R^d$, are selected from methyl, ethyl, n-propyl, n-butyl, n-pentyl and n-hexyl.

Still more preferably, two of $R^b$, $R^c$ and $R^d$, and more preferably each of $R^b$, $R^c$ and $R^d$, are n-butyl or n-hexyl.

In a further preferred embodiment, one of $R^a$, $R^b$, $R^c$ and $R^d$ may be substituted with hydroxy, methoxy or ethoxy.

Specific examples of preferred acyclic ammonium and phosphonium cations suitable for use according to the present invention include:

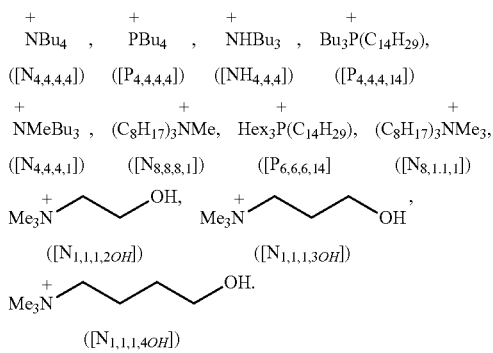

In a further embodiment of the invention, [Cat⁺] comprises a cation selected from guanidinium, cyclic guanidinium, uronium, cyclic uronium, thiuronium and cyclic thiuronium.

More preferably, [Cat⁺] comprises a cation having the formula:

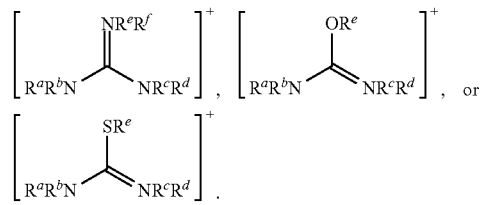

wherein: $R^a$, $R^b$, $R^b$, $R^d$, $R^e$, and $R^f$ are each independently selected from a $C_1$ to $C_{20}$, straight chain or branched alkyl group, a $C_3$ to $C_8$ cycloalkyl group, or a $C_6$ to $C_{10}$ aryl group, or any two of $R^a$, $R^b$, $R^b$, and $R^d$, attached to different nitrogen atoms form a methylene chain —(CH$_2$)$_q$— wherein q is from 2 to 5; wherein said alkyl, cycloalkyl or aryl groups or said methylene chain are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, $C_7$ to $C_{10}$ alkaryl, $C_7$ to $C_{10}$ aralkyl, —CN, —OH, —SH, —NO$_2$, —CO$_2$R$^x$, —OC(O)R$^x$, —C(O)R$^x$, —C(S)R$^x$, —CS$_2$R$^x$, —SC(S)R$^x$, —S(O)(C$_1$ to C$_6$)alkyl, —S(O)O(C$_1$ to C$_6$)alkyl, —OS(O)(C$_1$ to C$_6$)alkyl, —S(C$_1$ to C$_6$)alkyl, —S—S(C$_1$ to C$_6$ alkyl), —NR$^x$C(O)NR$^y$R$^z$, —NR$^x$C(O)OR$^y$, —OC(O)NR$^y$R$^z$, —NR$^x$C(S)OR$^y$, —OC(S)NR$^y$R$^z$, —NR$^x$C(S)SR$^y$, —SC(S)NR$^y$R$^z$, —NR$^x$C(S)NR$^y$R$^z$, —C(O)NR$^y$R$^z$, —C(S)NR$^y$R$^z$, —NR$^y$R$^z$, or a heterocyclic group, wherein $R^x$, $R_y$ and $R^z$ are independently selected from hydrogen or $C_1$ to $C_6$ alkyl.

Specific examples of guanidinium, uronium, and thiuronium cations suitable for use according to the present invention include:

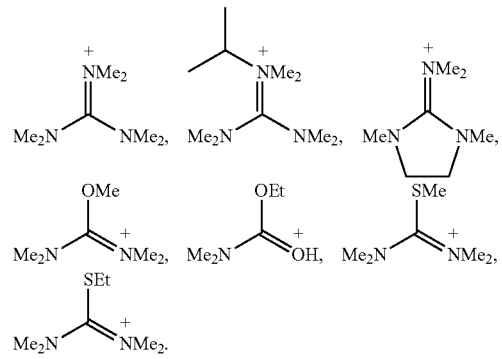

In a further preferred embodiment, [Cat⁺] comprises a cation comprising an electron-rich sulfur or selenium moiety. Examples include cations as defined above comprising pendant thiol, thioether, or disulfide substituents.

In still another preferred embodiment, [Cat⁺] represents one or more cations having a steric volume no greater than the steric volume of tributylmethylammonium.

In accordance with the present invention, [X⁻] may comprise one or more anions selected from halides, perhalides, pseudohalides, sulphates, sulphites, sulfonates, sulfonimides, phosphates, phosphites, phosphonates, methides, borates, carboxylates, azolates, carbonates, carbamates, thiophosphates, thiocarboxylates, thiocarbamates, thiocarbonates, xanthates, thiosulfonates, thiosulfates, nitrate, nitrite, perchlorate, amino acids and borates.

Thus, [X⁻] may represent one or more anions selected from:
a) a halide anion selected from: F⁻, Cl⁻, Br⁻, I⁻;
b) a perhalide anion selected from: [I₃]⁻, [I₂Br]⁻, [IBr₂]⁻, [Br₃]⁻, [Br₂Cl]⁻, [BrCl₂]⁻, [ICl₂]⁻, [I₂Cl]⁻, [Cl₃]⁻;
c) a pseudohalide anion selected from: [N₃]⁻, [NCS]⁻, [NCSe]⁻, [NCO]⁻, [CN]⁻;
d) a sulphate anion selected from: [HSO₄]⁻, [SO₄]²⁻, [R²OSO₂O]⁻;
e) a sulphite anion selected from: [HSO₃]⁻, [SO₃]²⁻, [R²OSO₂]⁻;
f) a sulfonate anion selected from: [R¹SO₂O]⁻;
g) a sulfonimide anion selected from: [(R¹SO₂)₂N]⁻;
h) a phosphate anion selected from: [H₂PO₄]⁻, [HPO₄]²⁻, [PO₄]³⁻, [R²OPO₃]²⁻, [(R²O)₂PO₂]⁻,
i) a phosphite anion selected from: [H₂PO₃]⁻, [HPO₃]²⁻, [R²OPO₂]²⁻, [(R²O)₂PO]⁻;
j) a phosphonate anion selected from: [R¹PO₃]²⁻, [R¹P(O)(OR²)O]⁻;
k) a methide anion selected from: [(R¹SO₂)₃C]⁻;
l) a borate anion selected from: [bisoxalatoborate], [bismalonatoborate];
m) a carboxylate anion selected from: [R²CO₂]⁻;
n) an azolate anion selected from: [3,5-dinitro-1,2,4-triazolate], [4-nitro-1,2,3-triazolate], [2,4-dinitroimidazolate], [4,5-dinitroimidazolate], [4,5-dicyano-imidazolate], [4-nitroimidazolate], [tetrazolate];
o) a sulfur-containing anion selected from: thiocarbonates (e.g. [R²OCS₂]⁻); thiocarbamates and (e.g. [R²₂NCS₂]⁻); thiocarboxylates (e.g. [R¹CS₂]⁻); thiophosphates (e.g. [(R²O)₂PS₂]⁻); thiosulfonates (e.g. [RS(O)₂S]⁻); and thiosulfates (e.g. [ROS(O)₂S]⁻; and
p) a nitrate ([NO₃]⁻) or nitrite ([NO₂]⁻) anion;
wherein: R¹ and R² are independently selected from the group consisting of C₁-C₁₀ alkyl, C₆ aryl, C₁-C₁₀ alkyl (C₆)aryl, and C₆ aryl(C₁-C₁₀)alkyl each of which may be substituted by one or more groups selected from: fluoro, chloro, bromo, iodo, C₁ to C₆ alkoxy, C₂ to C₁₂ alkoxyalkoxy, C₃ to C₈ cycloalkyl, C₆ to C₁₀ aryl, C₇ to C₁₀ alkaryl, C₇ to C₁₀ aralkyl, —CN, —OH, —SH, —NO₂, —CO₂Rˣ, —OC(O)Rˣ, —C(O)Rˣ, —C(S)Rˣ, —CS₂Rˣ, —SC(S)Rˣ, —S(O)(C₁ to C₆)alkyl, —S(O)O(C₁ to C₆)alkyl, —OS(O)(C₁ to C₆)alkyl, —S(C₁ to C₆)alkyl, —S—S(C₁ to C₆ alkyl), —NRˣC(O)NRʸRᶻ, —NRˣC(O)ORʸ, —OC(O)NRʸRᶻ, —NRˣC(S)ORʸ, —OC(S)NRʸRᶻ, —NRˣC(S)SRʸ, —SC(S)NRʸRᶻ, —NRˣC(S)NRʸRᶻ, —C(O)NRʸRᶻ, —C(S)NRʸRᶻ, —NRʸRᶻ, or a heterocyclic group, wherein Rˣ, Rʸ and Rᶻ are independently selected from hydrogen or C₁ to C₆ alkyl, and wherein R¹ may also be fluorine, chlorine, bromine or iodine.

Preferably, [X⁻] does not comprise perhalide anions or anions containing acidic hydrogen atoms.

In one preferred embodiment, [X]⁻ comprises or consists of a halide anion selected from: [F]⁻, [Cl]⁻, [Br]⁻, and [I]⁻. More preferably, [X⁻] comprises or consists of a halide anion selected from: [Cl]⁻ and [Br]⁻. Still more preferably, [X⁻] comprises or consists of a [Cl]⁻ anion.

In a further preferred embodiment, [X⁻] comprises or consists of a pseudohalide anion selected from: [N₃]⁻, [NCS]⁻, [NCSe]⁻, [NCO]⁻, and [CN]⁻.

In a further preferred embodiment, [X⁻] comprises or consists of a carboxylate anion selected from [R²CO₂]⁻, wherein R² is as defined above. Further examples of anions in this category include: [HCO₂]⁻, [MeCO₂]⁻, [EtCO₂]⁻, [CH₂(OH)CO₂]⁻, [CH₃CH(OH)CH₂CO₂]⁻, [PhCO₂]⁻. A particularly preferred carboxylate anion is [MeCO₂]⁻.

In a further preferred embodiment, [X⁻] comprises or consists of a sulphate anion [SO₄]²⁻.

In a further preferred embodiment, [X⁻] comprises an anion comprising an electron-rich sulfur or selenium moiety. Examples include: anions as defined above comprising pendant thiol, thioether, or disulfide substituents, [NCS]⁻, [NCSe]⁻, [R²OCS₂]⁻, [R²₂NCS₂]⁻, [R¹CS₂]⁻, [(R²O)₂PS₂]⁻, [R¹S(O)₂S]⁻ and [R²OS(O)₂S]⁻, wherein R¹ and R² are as defined above. Further examples of anions in this category include: [CH₂(SH)CO₂]⁻, [CH₃CH₂(SH)CO₂]⁻, [CH₃CS₂]⁻, [CH₃CH₂CS₂]⁻, [PhCS₂]⁻, [(MeO)₂PS₂]⁻, [(EtO)₂PS₂]⁻, [(PhO)₂PS₂]⁻, [(CH₃)₂NCS₂]⁻, [(CH₃CH₂)₂NCS₂]⁻, [Ph₂NCS₂]⁻, [CH₃OCS₂]⁻, [CH₃CH₂OCS₂]⁻, [PhOCS₂]⁻,

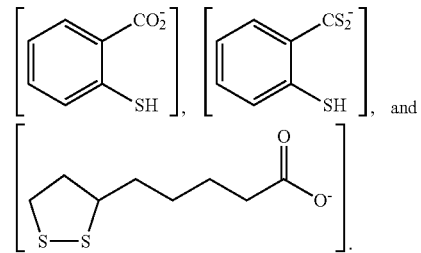

Most preferably, [X⁻] comprises or consists of a halide anion and/or a pseudohalide anion as defined above and/or [SO₄]²⁻. More preferably, [X⁻] is selected from [Cl]⁻, [Br]⁻ and [SCN]⁻. Most preferably, [X⁻] is [Cl]⁻.

It will be appreciated that the present invention is not limited to ionic liquids comprising a single cation and a single anion. Thus, [Cat⁺] may, in certain embodiments, represent two or more cations, such as a statistical mixture of 1,3-dimethylimidazolium, 1-ethyl-3-methylimidazolium and 1-3-diethylimidazolium. Similarly, [X⁻] may, in certain embodiments, represent two or more anions, such as a mixture of chloride ([Cl]⁻) and bromide ([Br]⁻).

It will also be appreciated that the relative molar amounts of [Cat⁺], [M⁺] and [X⁻] in the ionic liquids defined above are not fixed, but may take a range of values provided that there is overall charge balance. Thus, the relative molar amounts of [Cat⁺], [M⁺] and [X⁻] will depend on the concentration of the metal cations [M⁺] and the charges on each of the ions [Cat⁺], [M⁺], and [X].

The organic cations [Cat⁺] and anions [X⁻] defined above are generally single charged ions. However, in accordance with the present invention, it is not excluded that [Cat⁺] and/or [X⁻] may represent ions having a multiple charge, for instance doubly-, triply- or quadruply-charged ions. For example, [SO₄]²⁻ may be identified as an example of a doubly-charged anion falling within the definition of [X⁻].

The molar ratio of [Cat⁺] to [M⁺] in the ionic liquid is preferably in the range of from 10:1 to 1:2, more preferably in the range of from 5:1 to 1:2, and most preferably in the range of from 2:1 to 1:1. It has been found that a molar ratio of [Cat⁺] to [M⁺] of from 2:1 to 1:1 allows the metal loading of the ionic liquid to be maximised, without losing the ability to control the properties of the ionic liquid (for example, melting point and water miscibility) by the choice of the organic cation(s) [Cat⁺].

The ionic liquids used according to the present invention may be prepared by adding a salt of the metal cation [M⁺]

to an ionic liquid. Preferably, the anion or anions of the salt are the same as the ionic liquid anion [X⁻]. For instance, the metal salt may preferably comprise a halide anion, such as a chloride anion or a bromide anion.

Most preferably, the salt added to the ionic liquid is selected from FeCl₃, FeBr₃, CuCl₂, and CuBr₂.

In a preferred embodiment of the invention, the metal ion [M⁺] is combined with one or more ligands to form a coordination complex. Preferably, [X⁻] comprises one or more anionic species which function as ligands towards the metal ion [M⁺]. Alternatively, the ionic liquid may comprise neutral species which are capable of coordinating to the metal ion [M⁺], for example amines and phosphines.

Preferably, the coordination complex has the formula:

$$[(M^{x+})_n(L^{y-})_m]^{(nx-my)}$$

wherein: each $M^{x+}$ independently represents a metal ion [M⁺] as defined above, having a charge of x+;
each $L^{y-}$ independently represents a ligand having a charge of y−;
n is 1, 2 or 3;
m is 2, 3, 4, 5, 6, 7 or 8;
x is 2, 3, 4, 5 or 6; and
y is 0, 1, 2 or 3.

It will be appreciated that the exact structure of the coordination complex, and thus the values of n, m, x and y, depends on the chemistry of the particular metals and ligands that are used. Suitable structures are readily deducible by persons of skill in the art using basic principles of coordination chemistry.

Preferably, each $L^{y-}$ is independently selected from anionic species [X⁻] as defined above, [O²⁻] and [S²⁻].

More preferably, each $L^{y-}$ is independently selected from halide anions, perhalide ions, carboxylate anions, [O²⁻] and [S²⁻]. For example, each $L^{y-}$ may be independently selected from [F]⁻, [Cl]⁻, [Br]⁻, [I]⁻, [N₃]⁻, [NCS]⁻, [NCSe]⁻, [NCO]⁻, [CN]⁻, [R²CO₂]⁻, wherein R² is as defined above, [O²⁻] and [S²⁻].

Preferably, (nx-my) is a negative number. When (nx-my) is a negative number the coordination complex is referred to herein as a metallate anion.

Particularly preferred metallate anions include [FeCl₄]⁻, [CuCl₄]²⁻, [Cu₂Cl₆]²⁻ and [MoS₄]²⁻.

A metallate anion as defined above may be formed by the addition of a metal salt to the ionic liquid, whereby the ionic liquid anions combine with the metal salt to form the metallate anion.

For instance, where the ionic liquid is prepared by adding FeCl₃ to a chloride ionic liquid, such as [bmim]⁺[Cl]⁻ in an ionic liquid to metal ion ratio of 1:1, the metal salt combines with the chloride of the ionic liquid to form an ionic liquid having the formula [bmim]⁺[FeCl₄]⁻, wherein [FeCl₄]⁻ represents the metallate complex.

Where the ionic liquid is prepared by adding CuCl₂ to a chloride ionic liquid, such as [bmim]⁺[Cl]⁻, in an ionic liquid to metal ion ratio of 2:1, the metal salt combines with the chloride of the ionic liquid to form an ionic liquid having the formula ([bmim]⁺)₂([CuCl₄]²⁻), wherein [CuCl₄]²⁻ represents the metallate complex.

Alternatively, where the ionic liquid is prepared by adding CuCl₂ to a chloride ionic liquid, such as [bmim]⁺[Cl]⁻, in an ionic liquid to metal ion ratio of 1:1, the metal salt combines with the chloride of the ionic liquid to form an ionic liquid having the formula ([bmim]⁺)₂([Cu₂Cl₆]²⁻), wherein [Cu₂Cl₆]²⁻ represents the metallate complex.

It will also be appreciated that where the metal loading of the ionic liquid is low, the ionic liquid may comprise a mixture of metallate anions and non-complexed anions [X⁻].

The ionic liquids having the formula [Cat⁺][M⁺][X⁻] preferably have a melting point of 250° C. or less, more preferably 150° C. or less, still more preferably 100° C. or less, still more preferably 80° C. or less, and most preferably, the ionic liquid has a melting point below 30° C.

In some embodiments of the invention, the ionic liquid may comprise melting point suppressants as additives. Typically, melting point suppressing additives are used where the ionic liquid contains a moiety (such as a hydroxyl group) that can form hydrogen bonds to the melting point suppressing additive. Suitable melting point suppressing additives are well-known in the art, and include ethylene glycol, glycerol, urea, and phenol.

In other embodiments of the invention it may be preferred that the ionic liquid is free of melting point suppressing additives.

It has been found that the process of the present invention is not particularly sensitive to the presence of water, for instance the process of the present invention is compatible with hydrocarbon streams that comprise a minor proportion of water. In addition, the ionic liquid itself may comprise a minor proportion of water. Preferably, the water content of the starting ionic liquid is less than 30 wt %, more preferably less than 20 wt %, more preferably less than 10 wt %, and most preferably less than 5 wt %. For example, the use of a hydrated salt (such as CuCl₂.2H₂O) to prepare the ionic liquid may give rise to a minor proportion of water in the ionic liquid.

Most preferably, the ionic liquid is chosen so as to be substantially immiscible with the hydrocarbon fluid, particularly where the hydrocarbon fluid comprises a liquid hydrocarbon.

It has also been found that efficient partitioning of mercury from liquid and gaseous hydrocarbons is obtained using the processes of the present invention without the need for additives, such as cosolvents and/or mercury-complexing ligands and/or additional oxidants and/or redox intermediates, in the ionic liquid composition. Thus, in one preferred embodiment, the ionic liquid is free of cosolvents. In a further preferred embodiment, the ionic liquid is free of mercury-complexing ligands. In yet a further preferred embodiment, the ionic liquid is free of additional oxidants. In still a further preferred embodiment, the ionic liquid is free of additives which may function as redox intermediates.

In a further preferred embodiment, the ionic liquid may be immobilised on a solid support material.

In a second aspect, the present invention provides a process for the removal of mercury from a mercury-containing hydrocarbon fluid feed, the process comprising the steps of:
(i) contacting the mercury-containing hydrocarbon fluid feed with an ionic liquid immobilised on a solid support material, where the ionic liquid has the formula:

[Cat⁺][M⁺][X⁻]

wherein: [Cat⁺] represents one or more organic cationic species,
[M⁺] represents one or more metal cations selected from transition metal cations having an oxidation state of +2 or greater.
[X⁻] represents one or more anionic species;
(ii) separating from the ionic liquid a hydrocarbon fluid product having a reduced mercury content compared to the mercury-containing fluid feed.

In accordance with this second aspect of the invention, the ionic liquid is preferably as defined in connection with the first aspect of the invention. Preferred definitions of [Cat$^+$], [M$^+$] and [X$^-$] identified in connection with the first aspect of the invention are also preferred in connection with this second aspect of the invention. Furthermore, the metal cation [M$^+$] may be combined with one or more ligands to form a coordination complex, preferably a metallate anion, as described in connection with the first aspect of the invention.

Preferably, the solid support material used according to the above aspects of the present invention comprises or consists of a porous support material. Particularly preferred porous support materials are those having a BET surface area of from 10 m$^2 \cdot$g$^{-1}$ to 3000 m$^2 \cdot$g$^{-1}$, more preferably from 20 to 1000 m$^2 \cdot$g$^{-1}$, still more preferably from 50 to 500 m$^2 \cdot$g$^{-1}$, and most preferably from 100 to 300 m$^2$ g$^{-1}$.

The solid supports used according to the above aspects of the present invention are preferably in the form of pellets, granules or beads having a mass mean diameter in the range of from 0.1 mm to 100 mm, more preferably 0.5 mm to 50 mm, and most preferably 1 mm to 10 mm.

Examples of preferred porous solid support materials used according to the above aspects of the present invention include silica, alumina, silica-alumina, and activated carbon. Most preferably, the solid support material is silica.

In general, supported ionic liquids for use according to the above aspects of the invention comprise from 1 to 50 wt % of ionic liquid, more preferably 10 to 30 wt % of ionic liquid, and most preferably 15 to 25 wt % of ionic liquid, based on the total weight of ionic liquid and solid support. Solid supports containing these ratios of ionic liquid have been found to provide maximum surface area without blocking the pores of the support, or reducing the contact velocity.

In accordance with any aspects of the invention disclosed herein, the ionic liquid and the mercury-containing hydrocarbon fluid feed are preferably contacted in a hydrocarbon:ionic liquid volume ratio of from 1:1 to 10,000:1, more preferably from 20:1 to 10,000:1, more preferably from 100:1 to 10,000:1 and most preferably 1000:1 to 10,000:1. In general, a smaller volume of ionic liquid relative to the amount of hydrocarbon is preferred as this prevents the formation of emulsions.

In a further preferred embodiment, the ionic liquid:hydrocarbon contact ratio is selected such that 1 to 10,000 moles, more preferably 1 to 1000 moles, still more preferably 1 to 100 moles, still more preferably 1 to 10 moles, and most preferably 1 to 5 moles of the ionic liquid are contacted with the mercury-containing hydrocarbon fluid feed per mole of mercury in the mercury-containing hydrocarbon fluid feed.

In accordance with the foregoing aspects of the invention, the ionic liquid is preferably contacted with the mercury-containing hydrocarbon fluid feed at a temperature of from 0° C. to 250° C., more preferably from 10° C. to 150° C., still more preferably from 20° C. to 100° C., still more preferably from 40° C. to 80° C., and most preferably from 50° C. to 70° C.

The mercury-containing hydrocarbon fluid feed may be contacted with the ionic liquid at atmospheric pressure (approximately 100 kPa), although pressures above or below atmospheric pressure may be used if desired. For instance, the process may be conducted at a pressure of from 10 kPa to 10000 kPa, more preferably from 20 kPa to 1000 kPa, still more preferably 50 to 200 kPa, and most preferably 80 to 120 kPa.

Generally, it is most economical to contact the mercury-containing hydrocarbon fluid feed with the ionic liquid without the application of heat, and refinery product streams may be conveniently treated at the temperature at which they emerge from the refinery, which is typically up to 100° C.

The ionic liquid is allowed to contact the mercury-containing hydrocarbon fluid feed for sufficient time to enable at least a portion of the mercury in the mercury-containing hydrocarbon fluid feed to transfer into the ionic liquid phase. Suitable timescales include from 0.1 minute to 5 hours, more preferably from 0.2 minutes to 2 hours, and most preferably from 0.5 minutes to 1 hour.

In a third aspect, the present invention provides a process for the removal of mercury from a mercury-containing hydrocarbon fluid feed, the process comprising the steps of:
(i) contacting the mercury-containing hydrocarbon fluid feed with a solid supported metallate salt, where the metallate salt has the formula:

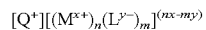

wherein: each M$^{x+}$ independently represents a metal cation [M$^+$] as defined above, having a charge of x+;
each L$^{y-}$ independently represents a ligand having a charge of y–;
n is 1, 2 or 3;
m is 2, 3, 4, 5, 6, 7 or 8;
x is 2, 3, 4, 5 or 6;
y is 0, 1, 2 or 3,
(nx-my) is a negative number, and
[Q$^+$] represents one or more inorganic cations having a total charge of (my-nx); and
(ii) separating from the ionic liquid a hydrocarbon fluid product having a reduced mercury content compared to the mercury-containing fluid feed.

It will be appreciated that the exact structure of the metallate anion $[(M^{x+})_n(L^{y-}(L^{y-})_m]^{(nx-my)}$, and thus the values of n, m, x and y, depends on the chemistry of the particular metals and ligands that are used. Suitable structures are readily deducible by persons of skill in the art using basic principles of coordination chemistry.

Preferably, each L$^{y-}$ is independently selected from anionic species [X$^-$] as defined above, as well as [O$^{2-}$] and [S$^{2-}$].

More preferably, each L$^{y-}$ is independently selected from halide anions, perhalide ions, carboxylate anions, [O$^{2-}$] and [S$^{2-}$]. For example, each L$^{y-}$ may be independently selected from [F]$^-$, [Cl]$^-$, [Br]$^-$, [I]$^-$, [N$_3$]$^-$, [NCS]$^-$, [NCSe]$^-$, [NCO]$^-$, [CN]$^-$, [R$^2$CO$_2$]$^-$, wherein R$^2$ is as defined above, [O$^{2-}$] and [S$^{2-}$].

Particularly preferred metallate anions include [FeCl$_4$]$^-$, [CuCl$_4$]$^{2-}$, [Cu$_2$Cl$_6$]$^{2-}$ and [MoS$_4$]$^{2-}$.

[Q$^+$] preferably represents one or more ions selected from [Li]$^+$, [Na]$^+$, [K]$^+$, [Mg]$^{2+}$, [Ca]$^{2+}$, and [NH$_4$]. More preferably, [Q$^+$] represents one or more ions selected from [Li]$^+$, and [Na]$^+$.

In accordance with this aspect of the invention, particularly preferred metallate salts include [Li]$^+_2$[Cu$_2$Cl$_6$]$^{2-}$, and [Li]$^+_2$[CuCl$_4$]$^2$.

In accordance with this aspect of the invention, the solid-supported metallate salt is preferably contacted with the mercury-containing hydrocarbon fluid feed at a temperature of from 0° C. to 250° C., more preferably from 10° C. to 150° C., still more preferably from 20° C. to 100° C., still more preferably from 40° C. to 80° C., and most preferably from 50° C. to 70° C.

The mercury-containing hydrocarbon fluid feed may be contacted with the solid-supported metallate salt at atmospheric pressure (approximately 100 kPa), although pressures above or below atmospheric pressure may be used if desired. For instance, the process may be conducted at a pressure of from 10 kPa to 10000 kPa, more preferably from 20 kPa to 1000 kPa, still more preferably 50 to 200 kPa, and most preferably 80 to 120 kPa.

Generally, it is most economical to contact the mercury-containing hydrocarbon fluid feed with the solid-supported metallate salt without the application of heat, and refinery product streams may be conveniently treated at the temperature at which they emerge from the refinery, which is typically up to 100° C.

The solid-supported metallate salt is allowed to contact the mercury-containing hydrocarbon fluid feed for sufficient time to enable at least a portion of the mercury in the mercury-containing hydrocarbon fluid feed to transfer into the ionic liquid phase. Suitable timescales include from 0.1 minute to 5 hours, more preferably from 0.2 minutes to 2 hours, and most preferably from 0.5 minutes to 1 hour.

In accordance with the foregoing aspects of the invention, the mercury-containing hydrocarbon fluid feed may be contacted with the ionic liquid or the solid-supported metallate salt by either continuous processes or batch processes.

In aspects of the invention that use a non-supported ionic liquid, the ionic liquid and the mercury-containing hydrocarbon fluid feed may be contacted using any conventional liquid-liquid or gas-liquid contactor apparatus in accordance with the present invention. For instance, the ionic liquid and the mercury-containing hydrocarbon fluid feed may be contacted using a counter-current liquid-liquid contactor, a co-current liquid-liquid contactor, a counter-current gas-liquid contactor, a co-current gas-liquid contactor, a liquid-liquid batch contactor, or a gas-liquid batch contactor.

In aspects of the invention that use a supported ionic liquid or a solid-supported metallate salt, contacting is preferably carried out using a fixed-bed contactor apparatus in which the mercury-containing hydrocarbon fluid feed is passed over a fixed bed of solid-supported ionic liquid or solid-supported metallate salt. Suitable contactors include fixed-bed continuous contactors, such as a fixed-bed scrubbing tower, and fixed-bed batch contactors.

In the continuous processes of the invention, contacting of the hydrocarbon fluid feed with the ionic liquid or the solid-supported metallate salt may be carried out continuously until the oxidising capacity of the ionic liquid/solid-supported metallate salt falls below a useful level, at which stage the ionic liquid/solid-supported metallate salt is replaced.

In the batch processes of the invention, the ionic liquid or the solid-supported metallate salt may be reused with a series of batches of hydrocarbon fluid feed, until such time as the oxidising capacity of the ionic liquid/solid-supported metallate salt falls below a useful level.

In accordance with the processes of the present invention, the ionic liquid or solid-supported metallate salt extracts at least 60 wt % of the mercury content of the mercury-containing hydrocarbon fluid feed. More preferably, the ionic liquid or solid-supported metallate salt extracts at least 70 wt %, still more preferably at least 80 wt %, still more preferably at least 90 wt %, still more preferably at least 95 wt %, and most preferably greater than 99 wt % of the mercury content of the mercury-containing hydrocarbon fluid feed.

Thus, in accordance with the processes of the present invention, a hydrocarbon fluid product may be obtained which contains less than 40 wt %, more preferably less than 30 wt %, more preferably less than 20 wt %, still more preferably less than 10 wt %, still more preferably less than 5 wt %, and most preferably less than 1 wt % of the mercury content of the mercury-containing hydrocarbon fluid feed.

Preferably the mercury concentration of the hydrocarbon fluid product of the processes of the invention is less than 50 ppb, more preferably less than 10 ppb, more preferably less than 5 ppb, still more preferably less than 2 ppb, still more preferably less than 1 ppb, yet still more preferably less than 0.5 ppb, yet still more preferably less than 0.2 ppb, and most preferably less than 0.1 ppb.

In preferred embodiments of the invention, an ionic liquid is obtained which contains at least 2 wt % mercury, more preferably at least 5 wt % mercury, still more preferably at least 10 wt % mercury, still more preferably 15 wt % mercury and most preferably at least 20 wt % mercury, based on the total weight of ionic liquid and mercury and exclusive of any solid support which may be used.

In addition, the processes of the invention may be repeated on the same mercury-containing hydrocarbon fluid feed in a series of contacting steps, e.g. two to ten, to obtain a successive reduction in the mercury content of the hydrocarbon fluid product at each step. Alternatively, the process of the invention may be used to supplement another conventional mercury removal process. However, one advantage of the present invention is that it avoids the need for pre-treatment of the hydrocarbon fluid to remove solidified species prior to the mercury removal step.

It will be appreciated that the processes of the present invention provide a single-step process for the removal of mercury from hydrocarbons. As such, the process may readily be incorporated into a multistage processing of hydrocarbon raw materials, such as crude oils, as used in commercial oil refineries. Typical multistage processing of hydrocarbons may involve processes such as distillation, cracking, deacidification and desulfurization. Such processes are well understood by persons of skill in the art.

In a fourth aspect, the present invention provides the use of an ionic liquid as defined above for the removal of mercury from a mercury-containing hydrocarbon fluid.

Preferably, said use comprises or consists of carrying out a process as defined above.

In a fifth aspect, the present invention provides the use of an ionic liquid immobilised on a solid support as defined above for the removal of mercury from a mercury-containing hydrocarbon fluid.

Preferably, said use comprises or consists of carrying out a process as defined above.

In a fifth aspect, the present invention provides the use of a solid supported metallate salt as defined above for the removal or mercury from a mercury-containing hydrocarbon fluid. Preferably, said use comprises or consists of carrying out a process as defined above.

The present invention will now be described by way of example and by reference to the accompanying figures, in which.

EXAMPLES

Figure 1:
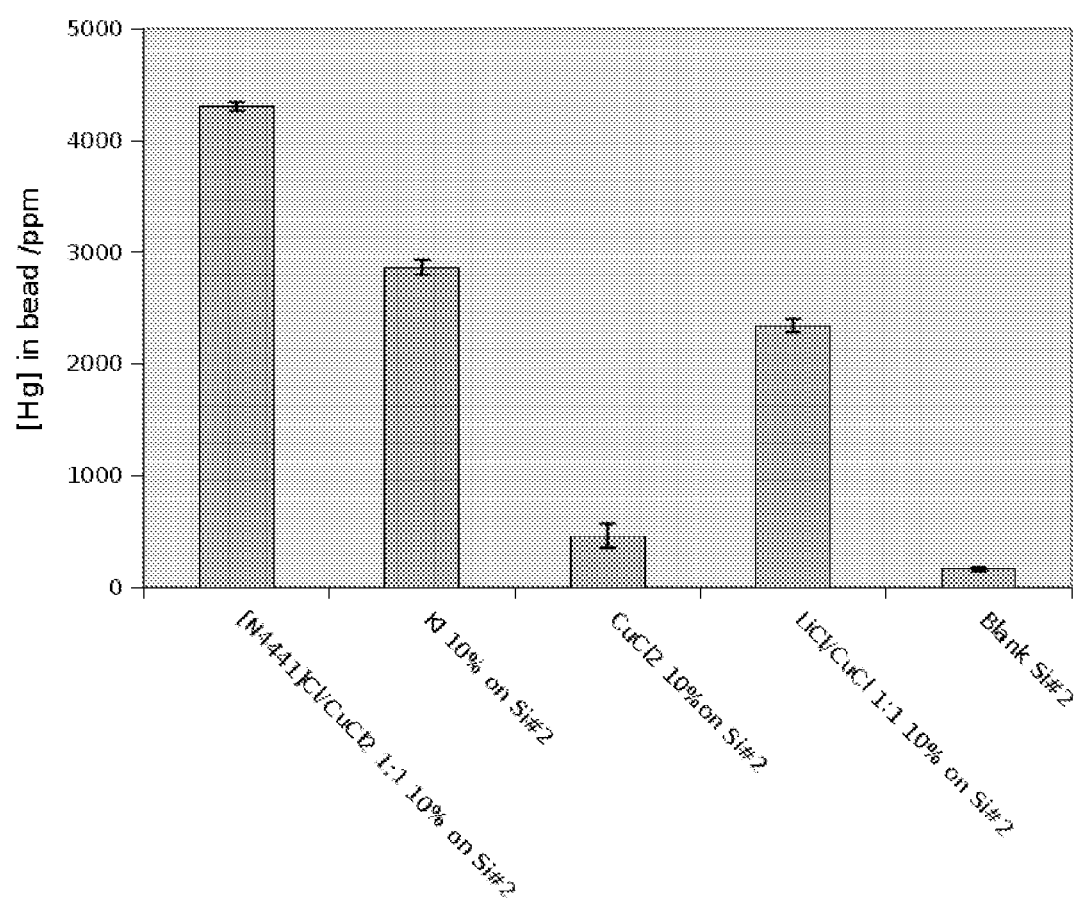
FIG. 1 is a graph showing a comparison of the extractive capacity of ionic liquids having metallate anions, non-ionic liquid metallate salts, and non-ionic liquid non-metallate salts.

As used in the following examples:

[$C_n$mim] refers to a 1-alkyl-3-methylimidazolium cation in which the alkyl group contains n carbon atoms

[$N_{w,x,y,z}$] refers to a tetraalkylammonium cation in which the alkyl groups have w, x, y and z carbon atoms respectively.

[$P_{w,x,y,z}$] refers to a tetraalkylphosphonium cation in which the alkyl groups have w, x, y and z carbon atoms respectively.

Example 1

Extraction of Elemental Mercury by Copper-containing Ionic Liquids

1-Butyl-3-methylimidazolium chloride (5 g, 29 mmol) and copper(II) chloride dihydrate (5 g, 29 mmol) were combined in a flask and heated to 70° C. under vacuum to give a yellow-brown viscous oil.

0.037 g of the oil was contacted with 0.0183 g elemental mercury and heated in a sealed tube to 60° C. overnight to yield a pale, slightly blue ionic liquid containing a pale off white precipitate. 10 cm$^3$ of deionised water was added to the mixture, filtered, and diluted to 50 cm$^3$. 1 cm$^3$ of the diluted solution was further diluted to 50 cm$^3$ with deionised water. The resulting solution was analysed for mercury using a Milestone DMA-80 direct mercury analyser. The solution was found to contain 3.27±0.21 ppm mercury, demonstrating that 0.22 g of mercury per gram of initial ionic liquid had been converted into a water soluble ionic form, compared to a theoretical uptake of 0.294 g/g mercury based on two electron reduction of Cu(II) to Cu(I).

Example 2

Extraction of Elemental Mercury by Copper-containinq Ionic Liquids

The copper(II)-containing ionic liquid of Example 1 was contacted with 0.355 g elemental mercury and heated in a sealed tube to 60° C. overnight. The resulting mixture was analysed as in Example 1 and was found to contain 7.02±0.24 ppm mercury in the analyte solution, corresponding to 18.6 wt % mercury solubilised.

Example 3

Extraction of Elemental Mercury from Dodecane

An ionic liquid was prepared from a 2:1 molar ratio of 1-butyl-3-methylimidazolium chloride and copper(II) chloride dihydrate. 0.18 g of the ionic liquid was added to a sample vial with 10 cm$^3$ of dodecane containing 1000 ppm of elemental mercury, and the resulting mixture was stirred overnight at 60° C. The resulting dodecane phase was then analysed for total mercury concentration and was found to contain 34.9 ppb of mercury.

Example 4

Extraction of Mercury(II) Chloride from Dodecane

An ionic liquid was prepared from a 2:1 molar ratio of 1-butyl-3-methylimidazolium chloride and copper(II) chloride dihydrate. 0.275 g of the ionic liquid was added to a sample vial with 10 cm$^3$ of dodecane and 0.069 g of HgCl$_2$, corresponding to a total mercury content of 8115 ppm, and the resulting mixture was stirred overnight at 60° C. The resulting dodecane phase was then analysed for total mercury concentration and was found to contain 42.75 ppb of mercury. The ionic liquid was found to contain 176,000 ppm of mercury.

A further charge of 0.0397 g of HgCl$_2$ was then added to the mixture and stirred for one hour at 60° C. The resulting dodecane phase was then analysed for total mercury concentration and was found to contain 96.75 ppb of mercury, i.e. 0.46% of the initial mercury concentration. The ionic liquid was found to contain 292,000 ppm of mercury.

Example 5

Extraction of Mercury(II) Oxide from Dodecane

An ionic liquid was prepared from a 2:1 molar ratio of 1-butyl-3-methylimidazolium chloride and copper(II) chloride dihydrate. 0.22 g of the ionic liquid was added to a sample vial with 10 cm$^3$ of dodecane and 0.0114 g of HgO corresponding to a total mercury content of 1696 ppm, and the resulting mixture was stirred overnight at 60° C. The resulting dodecane phase was then analysed for total mercury concentration and was found to contain 13.25 ppb of mercury. The ionic liquid was found to contain 4.8 wt % of mercury.

A further charge of 0.0152 g of HgO was then added to the mixture and stirred for one hour at 60° C. The resulting dodecane phase was then analysed for total mercury concentration and was found to contain 69.95 ppb of mercury. The ionic liquid was found to contain 11.1 wt % of mercury.

Example 6

Extraction of Elemental Mercury from Dodecane

An ionic liquid was prepared from a 2:1 molar ratio of 1-butyl-3-methylimidazolium chloride and copper(II) chloride dihydrate. 0.23 g of the ionic liquid was added to a sample vial with 10 cm$^3$ of dodecane containing 0.0488 g of elemental mercury, and the resulting mixture was stirred overnight at 60° C. The resulting dodecane phase was then analysed for total mercury concentration and was found to contain 946.7 ppb of mercury. The ionic liquid was found to contain 21.2 wt % of mercury. The resultant mixture contained IL saturated with mercury, hydrocarbon saturated with mercury and a small amount of dispersed elemental mercury.

A further charge of 0.0768 g of the ionic liquid was then added to the mixture and stirred for one hour at 60° C. The resulting dodecane phase was then analysed for total mercury concentration and was found to have been reduced to 65.55 ppb of mercury.

The results of Examples 3 to 6 are shown in Table 1.

TABLE 1

| Example No. | | Initial [Hg] in System/ppm | Final [Hg] in $C_{12}$/ppb | Hg in IL/% |
|---|---|---|---|---|
| 3 | Hg(0) | 0.00202 | 34.9 | 0.0000069 |
| Initial charge of Hg | | | | |
| 4 | $HgCl_2$ | 8115 | 42.75 | 18.5 |
| 5 | HgO | 1696 | 13.25 | 4.8 |
| 6 | Hg(0) | 7833 | 946.7 | 21.2 |
| Second charge of Hg | | | | |
| 4 | $HgCl_2$ | 12784 | 96.75 | 29.2 |
| 5 | HgO | 3958 | 69.95 | 11.1 |
| Second charge of IL | | | | |
| 6 | Hg(0) | 7738 | 65.55 | 15.9 |

[Hg] refers to mercury concentration
$C_{12}$ refers to dodecane

Example 7

Extraction of Elemental Mercury by Copper-containing Choline Chloride/ethylene Glycol Eutectic Fluid A mixture of choline chloride (30 g) and ethylene glycol (60 g) was prepared by mixing and heating to 50° C. to ensure the choline chloride was thoroughly dissolved following the procedure described by Abbott et al., PCCP 2009, 11, 4269. Copper chloride dihydrate (1.3 g, 7.6 mmol) was then added to the choline chloride/ethylene glycol eutectic (4.76 g, 11.4 mmol) to give a dark green-black fluid.

Elemental mercury (0.35 g) was added to a sample of the eutectic fluid (0.85 g) and heated overnight at 60° C. A large volume of pale green precipitate was formed. A sample of 0.17 g of the liquid was diluted with 5 cm³ of deionised water giving a pale green solution and white precipitate. The solution was filtered and diluted to 50 cm³, and 1 cm³ of the diluted solution was further diluted to 50 cm³ with deionised water. The resulting solution was analysed for mercury using a Milestone DMA-80 direct mercury analyser. It was found that the eutectic fluid contained 16.9 wt % water soluble mercury species, based on the original eutectic mixture.

Example 8

Extraction of Elemental Mercury by Ionic Liquids Containing Different Metallate Anions This example examines the effectiveness of ionic liquids containing different metallate anions in the extraction of bulk elemental mercury. A sample of each ionic liquid was contacted with bulk elemental mercury, and stirred at 60° C. overnight, and a small sample of the resultant ionic liquid extracted into water and analysed for soluble mercury according to the procedure described in Example 1. The ionic liquids used and the results obtained are shown in Table 2.

TABLE 2

| Ionic Liquid/Metal Salt (molar ratio IL/metal salt) | [Hg] in IL after contacting/ppm | Mass percent mercury dissolved in IL |
|---|---|---|
| $[C_2mim][Cl]/CuCl_2$ (2:1) | 212604 | 21.3 |
| $[N_{4,4,4,1}][Cl]/CuCl_2$ (2:1) | 158917 | 15.9 |
| $[C_2mim][Cl]/CuCl_2·2H_2O$ (2:1) | 255241 | 25.5 |
| $[N_{4,4,4,1}][Cl]/CuCl_2·2H_2O$ (2:1) | 151753 | 15.2 |
| $[C_4mim][Br]/CuBr_2$ (2:1) | 30542 | 3.1 |

Example 9

Extraction of Elemental Mercury by Supported Ionic Liquids

This example demonstrates the effect of different cations on the extraction of elemental mercury from natural gas condensate. (from PETRONAS Onshore Gas Terminal, Kerteh, Malaysia)

A series of ionic liquids was formed using a 2:1 molar ratio of [Q][Cl] ionic liquid and $CuCl_2$ (where [Q] represents the ionic liquid cation). Davisil SP540 powdered silica was impregnated with each of the ionic liquids to obtain supported ionic liquids containing 1 wt % Cu(II) (ca. 7.5 to 17 wt % IL depending on cation). The solid supported ionic liquid was compressed to a wafer and contacted with a stirred reservoir of mercury-containing condensate for three hours. A comparison using silica without ionic liquid is also provided. The results are shown in Table 3.

TABLE 3

| [Q] | Mass IL in wafer/ g | Mass Hg in condensate/ ng | Starting [Hg] in condensate/ ppm | Final [Hg] in wafer/ ppm | Final [Hg] in IL*/ ppm |
|---|---|---|---|---|---|
| $[C_4mim]$ | 0.0032 | 1455 | 455 | 361 | 4750 |
| $[P_{66614}]$ | 0.0032 | 1228 | 383 | 289 | 1562 |
| $[N_{4441}]$ | 0.0053 | 1600 | 301 | 207 | 2070 |
| Silica | 0.0055 | 521 | 94 | 0 | 0 |

*Exclusive of solid support

Example 10

Extraction of Elemental Mercury by Supported Ionic Liquids

This example demonstrates the effect of different cations on the extraction of elemental mercury from hexane.

A series of chlorometallate ionic liquids was formed from ionic liquids of the formula $[Cat^+][Cl]$ and $CuCl_2$ at different molar ratios. The ionic liquids were impregnated into porous silica beads (Johnson Matthey, 2-4 mm diameter, 122 m²/g surface area) and contacted with hexane in the presence of a reservoir of elemental mercury in a stirred tank reactor for a period of 18 days. The composition of the solid supported IL and was determined for each IL after 6 days, 13 days and 18 days, and the results are shown in Table 4.

TABLE 4

| IL | Day | [Hg] in solution/ppm | [Hg] in bead/ppm | Hg in bead/ wt % | Theoretical Hg capacity of IL | Progress to saturation |
|---|---|---|---|---|---|---|
| [P$_{66614}$]Cl:CuCl$_2$ 2:1 | 6 | 0.7227 | 651 | 0.07 | 0.84972 | 7.66% |
| | 13 | 1.9375 | 1120 | 0.11 | 0.84972 | 13.18% |
| | 18 | 2.5043 | 2003 | 0.20 | 0.84972 | 23.58% |
| [C$_4$mim]Cl:CuCl$_2$ 2:1 | 6 | 3.3750 | 2446 | 0.24 | 2.06137 | 11.86% |
| | 13 | 6.2767 | 5062 | 0.51 | 2.06137 | 24.56% |
| | 18 | 6.9473 | 5838 | 0.58 | 2.06137 | 28.32% |
| [C$_4$mim]Cl:CuCl$_2$ 1:1 | 6 | 2.5714 | 1773 | 0.18 | 3.23525 | 5.48% |
| | 13 | 4.9129 | 3388 | 0.34 | 3.23525 | 10.47% |
| | 18 | 9.2259 | 6363 | 0.64 | 3.23525 | 19.67% |
| [N$_{4441}$]Cl:CuCl$_2$ 2:1 | 6 | 2.7097 | 2203 | 0.22 | 1.65224 | 13.33% |
| | 13 | 6.0009 | 2927 | 0.29 | 1.65224 | 17.72% |
| | 18 | 6.3139 | 6577 | 0.66 | 1.65224 | 39.81% |
| [N$_{4441}$]Cl:CuCl$_2$ 1:1 | 6 | 3.0407 | 2534 | 0.25 | 2.70653 | 9.36% |
| | 13 | 6.3527 | 3208 | 0.32 | 2.70653 | 11.85% |
| | 18 | 7.8380 | 5559 | 0.56 | 2.70653 | 20.54% |
| [N$_{4441}$]Cl:CuCl$_2$ 30% load 1:1 | 6 | 3.2485 | 1511 | 0.15 | 8.20161 | 1.84% |
| | 13 | 4.9564 | 1967 | 0.20 | 8.20161 | 2.40% |
| | 18 | 9.6332 | 8164 | 0.82 | 8.20161 | 9.95% |

Example 11

Extraction of Elemental Mercury by Supported Ionic Liquids

This example demonstrates the competitive extraction of mercury from hexane to ionic liquids and non-ionic liquid salts impregnated into silica spheres (Johnson Matthey, 1.7-4 mm diameter, 135 m$^2$·g$^{-1}$ surface area) and Calgon AP4-60 activated carbons. Reaction conditions are as in Example 10. The data in Table 5 shows that the silica supported material gave greater uptake of mercury compared to activated carbon supported materials under competitive extraction conditions.

TABLE 5

| Ionic liquid and support | [Hg] in bead/ppm | Hg in bead/ wt % | Error (%) | [Hg] in bead/ppm | Hg in bead/ wt % | Error (%) |
|---|---|---|---|---|---|---|
| | After 3 days | | | After 8 days | | |
| [bmim]Cl/CuCl$_2$ (1:1 on Silica spheres) | 857 | 0.086% | 0 | 3560 | 0.3560 | 0 |
| [bmim]Cl/CuCl$_2$ (1:1 on AP4-60) | 535 | 0.054% | 5 | 882 | 0.0882% | 3 |
| choline:EG/CuCl$_2$ (1:1 on AP4-60) | 400 | 0.040% | 3 | 788 | 0.0788% | 27 |
| choline:EG/CuCl$_2$ (2:1 on AP4-60) | 217 | 0.022% | 69 | 1024 | 0.1024% | 18 |
| [bmim]Cl/CuCl$_2$ (2:1 on AP4-60) | 110 | 0.011% | 11 | 950 | 0.0950% | 26 |
| [N$_{4,4,4,1}$]Cl/CuCl$_2$ (2:1 on AP4-60) | 502 | 0.050% | 27 | 966 | 0.0966% | 15 |

Example 12

Extraction of Elemental Mercury by Ionic Liquid Salts and Non-ionic Liquid Metallate Salts This example demonstrates the extraction of mercury from hexane to ionic liquids and non-ionic liquid metallate salts impregnated into silica beads with a size range of either 0.7 to 1.4 or 1.7 to 4.0 mm diameter (ex Johnson Matthey). Reaction conditions are as in Example 11. The data is shown in Table 6.

TABLE 6

| Ionic liquid and support | [Hg] in bead/ ppm | Hg in bead/ wt % | Error (%) | [Hg] in bead/ ppm | Hg in bead/ wt % | Error (%) |
|---|---|---|---|---|---|---|
| | After 3 days | | | After 8 days | | |
| [N$_{444}$H]Cl/CuCl$_2$ 1:1 10% on Si#5 | 3311 | 0.331 | 15 | 14324 | 1.43242 | 0.63 |
| [N$_{444}$H]Cl/CuCl$_2$ 1:1 20% on Si#5 | 5092 | 0.509 | 5 | 14128 | 1.41277 | 0.90 |
| [N$_{444}$H]Cl/CuCl$_2$ 1:1 30% in Si#5 | 6407 | 0.640 | 0.7 | 14298 | 1.42978 | 0.19 |
| [N$_{4441}$]Cl/CuCl$_2$ 1:1 10% on Si#5 | 1919 | 0.192 | 21 | 7680 | 0.76802 | 1.87 |

TABLE 6-continued

| Ionic liquid and support | [Hg] in bead/ ppm | Hg in bead/ wt % | Error (%) | [Hg] in bead/ ppm | Hg in bead/ wt % | Error (%) |
|---|---|---|---|---|---|---|
| | After 3 days | | | After 8 days | | |
| [N$_{4441}$]Cl/CuCl$_2$ 1:1 20% on Si#5 | 4725 | 0.472 | | 18499 | 1.84986 | 2.13 |
| [N$_{4441}$]Cl/CuCl$_2$ 1:1 30% on Si#5 | 9713 | 0.971 | 53 | 14834 | 1.4834 | 0.18 |
| [N$_{4441}$]Cl/CuCl$_2$ 1:1 10% on Si#1 | 7743 | 0.774 | 22 | 26112 | 2.61119 | 0.25 |

TABLE 6-continued

| Ionic liquid and support | [Hg] in bead/ ppm After 3 days | Hg in bead/ wt % | Error (%) | [Hg] in bead/ ppm After 8 days | Hg in bead/ wt % | Error (%) |
|---|---|---|---|---|---|---|
| [$N_{4441}$]Cl/CuCl$_2$ 1:1 10% on Si#2 | 10273 | 1.027 | 4 | 27432 | 2.74316 | 4.62 |
| [$N_{4441}$]Cl/CuCl$_2$ 1:1 10% on Si#4 | 12936 | 1.294 | 36 | 26073 | 2.60728 | 0.16 |
| [$N_{4441}$]$_2$MoS$_4$ on Si#5 | 298 | 0.030 | 4 | 3971 | 0.39705 | 4.51 |
| [$P_{66614}$]$_2$MoS$_4$ on Si#5 | 642 | 0.064 | 4 | 2927 | 0.29272 | 8.81 |
| [$NH_4$]$_2$MoS$_4$ on Si#5 | 61 | 0.061 | 15 | 5076 | 0.50763 | 7.83 |

Example 13

Comparison of Extractive Capacity of Solid-supported Ionic Liquids Having Metallate Anions, Non-ionic Liquid Solid-Supported Metallate Salts, and Non-metallate Salts This example provides a comparison of the extractive capacities of silica beads impregnated with CuCl$_2$, LiCl/CuCl$_2$ (1:1, forming the metallate anion $Cu_2Cl_6^{2-}$), and [$N_{4,4,4,1}$]Cl/CuCl$_2$ (1:1, also forming the metallate anion $Cu_2Cl_6^{2-}$). The data in FIG. 1 shows a clear improvement in extraction with salts containing metallate anions, and a further improvement when an ionic liquid is used.

Example 14

Liquid-IL Extraction of Total Mercury from Condensate Using C$_4$mim Cl/CuCl$_2$.2H$_2$O (2:1)

The ionic liquid composition, [C$_4$mim]Cl/CuCl$_2$.2H$_2$O (2:1), was prepared by direct combination, with warming, of the two components, 1-butyl-3-methylimidazolium chloride and copper(II)chloride dihydrate. Natural gas condensate was contacted with the ionic liquid at 50:1 condensate:IL mass ratio, stirred at room temperature and the upper bulk condensate phase periodically sampled for direct mercury analysis using a Milestone DMA-80 mercury analyser.

The results are shown in Table 7, and demonstrate that after 60 min, approximately 75% of the total mercury in the sample had been removed, and after 1 day, the mercury content had been reduced to less than 3 ppb.

TABLE 7

| Time/min | Mercury concentration in condensate/µg kg$^{-1}$ (ppb) |
|---|---|
| 0 | 96.95 |
| 20 | 62.47 |
| 40 | 36.84 |
| 60 | 25.63 |
| 1440 | 2.58 |

Example 15

Scrubbing of Mercury from a Gas by Supported Ionic Liquids

Extraction of mercury from gas streams was demonstrated by passing a mercury-containing gas stream (mercury concentration 20-30 mg/m$^3$, flow-rate 60 ml/min.) through a pipe reactor (1/4" ss tube of thickness 0.035") containing 0.1 g, ca 0.2 cm$^3$ of supported ionic liquid (bed length ca 1.2 cm). The mercury content at the reactor outlet was measured periodically by withdrawing gas samples and analysing using a PSA Sir Galahad mercury analyser. The detection limit for measurements was 2 µg/m$^3$.

Figure 2:
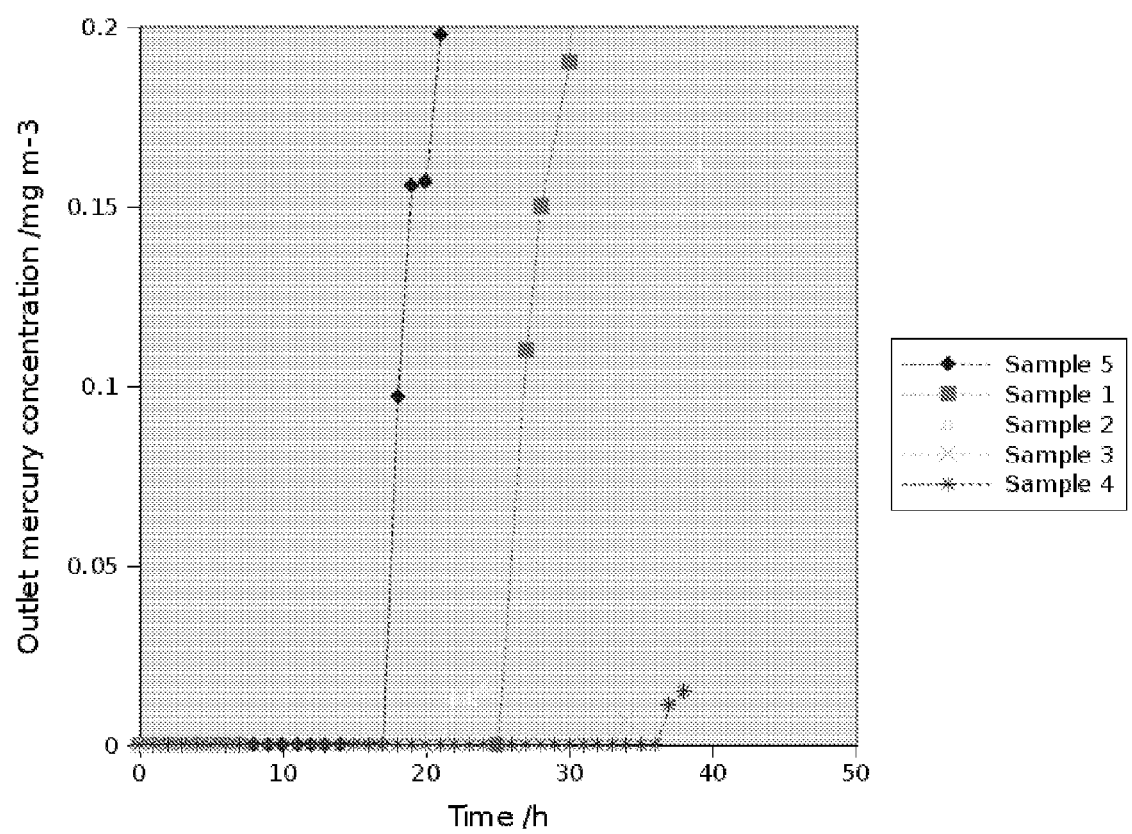
FIG. 2 is a graphical representation of the data in Table 8, showing a comparison of the capacity of ionic liquids supported on activated carbon and porous silicas and a commercial sulfur-impregnated activated carbon to remove mercury from a gas stream.

Results from tests with ionic liquids supported on activated carbon and porous silicas are shown in Table 8 and graphically in FIG. 2, compared to a comparative experiment with a commercial sulfur-impregnated activated carbon, and demonstrate that all four supported ionic liquids were more effective than the commercial sulfur-impregnated activated carbon at removing mercury.

TABLE 8

| | Composition | Time to detect mercury at outlet (h) | Mercury concentration measured at breakthrough (µg/m$^3$) | Percentage mercury loading on extractant at breakthrough |
|---|---|---|---|---|
| Sample 1 | [C$_4$mim]Cl/CuCl$_2$ 1:1 10 wt % impregnated into Calgon AP4-60 activated carbon | 27 | 110 | 2.43 |
| Sample 2 | [$N_{4441}$]Cl/CuCl$_2$ 1:1 12 wt % impregnated into Calgon AP4-60 | 22 | 13 | 1.98 |
| Sample 3 | [C$_4$mim]Cl/CuCl$_2$ 1:1 10 wt % impregnated into porous silica (Johnson Matthey, SA 135 m$^2$/g, PV 0.85 cm$^3$/mL) | 34 | 7 | 3.06 |
| Sample 4 | [C$_4$mim]Cl/CuCl$_2$ 1:1 10 wt % impregnated into porous granular silica (Grace Davison Davicat SI1157) | 37 | 11 | 3.33 |
| Sample 5 | Comparative test with commercial sulfur-impregnated activated carbon (Chemviron Carbon, Calgon-HGR) | 18 | 97 | 1.62 |

The invention claimed is:

1. A process for the removal of mercury from a mercury-containing hydrocarbon fluid feed, the process comprising the steps of:
   (i) contacting the mercury-containing hydrocarbon fluid feed with an ionic liquid having the formula:

[Cat⁺][M⁺][X⁻]

wherein: [Cat⁺] represents one or more organic cationic species,
      [M⁺] represents one or more metal cations selected from transition metal cations having an oxidation state of +2 or greater,
      [X⁻] represents one or more anionic species; and
   (ii) separating from the ionic liquid a hydrocarbon fluid product having a reduced mercury content compared to the mercury-containing fluid feed.

2. A process according to claim 1, wherein [M⁺] represents at least one metal cations having an oxidation state of at least +2 selected from first row transition metal cations and molybdenum cations, or at least one member of a group consisting of iron cations, copper cations, molybdenum cations and cobalt cations.

3. A process according to claim 2, wherein [M⁺] represents at least one metal cations selected from $Fe^{3+}$, $Cu^{2+}$, $Mo^{6+}$, and $Co^{2+}$.

4. A process according to claim 3, wherein [M⁺] represents $Fe^{3+}$ or $Cu^{2+}$.

5. A process according to claim 1, wherein the mercury concentration in the mercury-containing hydrocarbon fluid feed is in the range of from 1 to 250,000 parts per billion.

6. A process according to claim 1, wherein the hydrocarbon fluid feed comprises at least one of elemental mercury, particulate mercury, or organic mercury.

7. A process according to claim 1, wherein the mercury-containing hydrocarbon fluid feed is a liquid, and the mercury-containing hydrocarbon fluid feed comprises at least one of:
   (i) a liquefied natural gas;
   (ii) a light distillate comprising at least one member of a group consisting of: liquid petroleum gas, gasoline, and naphtha;
   (iii) a natural gas condensate;
   (iv) a middle distillate comprising at least one member of a group consisting of: kerosene and diesel;
   (v) a heavy distillate; and
   (vi) a crude oil.

8. A process according to claim 1, wherein the mercury-containing hydrocarbon fluid feed is a gas, and the mercury-containing hydrocarbon fluid feed comprises at least one member of a group consisting of: natural gas and refinery gas.

9. A process according to claim 1, wherein [Cat⁺] comprises a cationic species selected from the group consisting of: ammonium, benzimidazolium, benzofuranium, benzothiophenium, benzotriazolium, borolium, cinnolinium, diazabicyclodecenium, diazabicyclononenium, 1,4-diazabicyclo-[2.2.2] octanium, diazabicyclo-undecenium, dithiazolium, furanium, guanidinium, imidazolium, indazolium, indolinium, indolium, morpholinium, oxaborolium, oxaphospholium, oxazinium, oxazolium, iso-oxazolium, oxothiazolium, phospholium, phosphonium, phthalazinium, piperazinium, piperidinium, pyranium, pyrazinium, pyrazolium, pyridazinium, pyridinium, pyrimidinium, pyrrolidinium, pyrrolium, quinazolinium, quinolinium, iso-quinolinium, quinoxalinium, quinuclidinium, selenazolinium, sulfonium, tetrazolium, thiadiazolium, iso-thiadiazolium, thiazinium, thiazolium, iso-thiazolium, thiophenium, thiuronium, triazinium, triazolium, iso-triazolium, and uronium.

10. A process according to claim 9, wherein [Cat⁺] comprises a cationic species selected from the group consisting of:

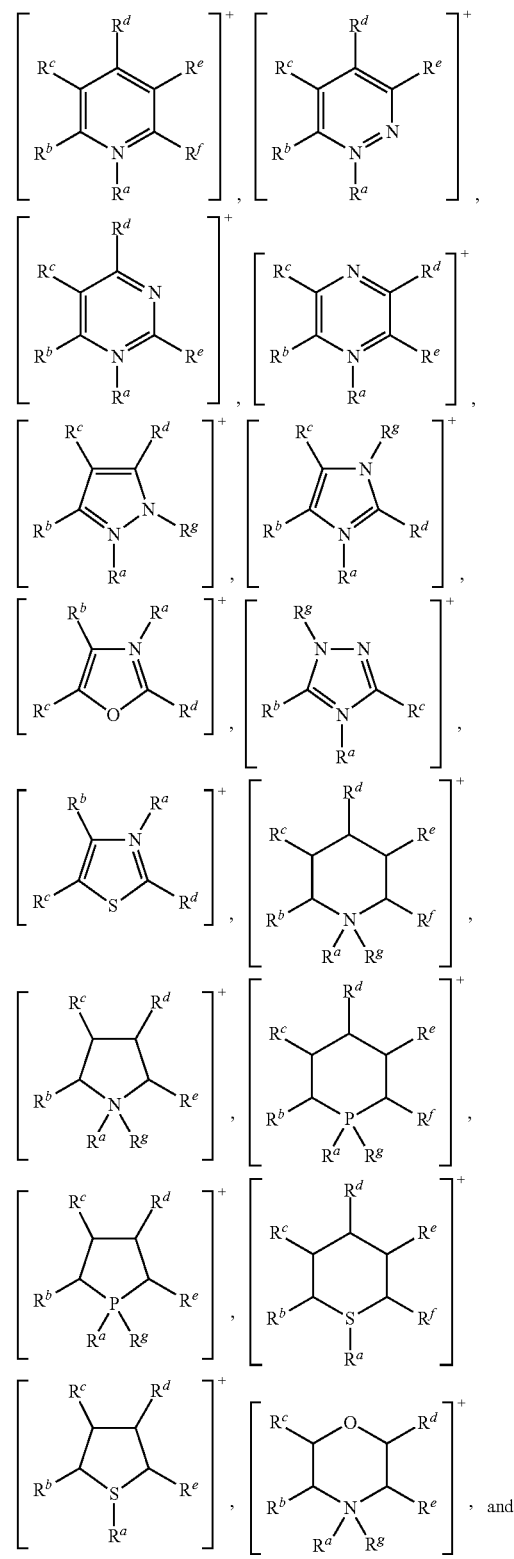

-continued

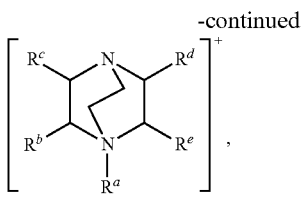

wherein: $R^a$, $R^b$, $R^c$, $R^d$, $R^e$, $R^f$ and $R^g$ are each independently selected from hydrogen, a $C_1$ to $C_{20}$, straight chain or branched alkyl group, a $C_3$ to $C_8$ cycloalkyl group, or a $C_6$ to $C_{10}$ aryl group, or any two of $R^b$, $R^c$, $R^d$, $R^e$ and $R^f$ attached to adjacent carbon atoms form a methylene chain —$(CH_2)_q$— wherein q is from 3 to 6; and wherein said alkyl, cycloalkyl or aryl groups or said methylene chain are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, $C_7$ to $C_{10}$ alkaryl, $C_7$ to $C_{10}$ aralkyl, —CN, —OH, —SH, —NO$_2$, —CO$_2$R$^x$, —OC(O)R$^x$, —C(O)R$^x$, —C(S)R$^x$, —CS$_2$R$^x$, —SC(S)R$^x$, —S(O)($C_1$ to $C_6$)alkyl, —S(O)O($C_1$ to $C_6$)alkyl, —OS(O)($C_1$ to $C_6$)alkyl, —S($C_1$ to $C_6$)alkyl, —S—S($C_1$ to $C_6$ alkyl), —NR$^x$C(O)NR$^y$R$^z$, —NR$^x$C(O)OR$^y$, —OC(O)NR$^y$R$^z$, —NR$^x$C(S)OR$^y$, —OC(S)NR$^y$R$^z$, —NR$^x$C(S)SR$^y$, —SC(S)NR$^y$R$^z$, —NR$^x$C(S)NR$^y$R$^z$, —C(O)NR$^y$R$^z$, —C(S)NR$^y$R$^z$, —NR$^y$R$^z$, or a heterocyclic group, wherein R$^x$, R$^y$ and R$^z$ are independently selected from hydrogen or $C_1$ to $C_6$ alkyl.

11. A process according to according to claim 10, wherein [Cat$^+$] comprises a cationic species selected from:

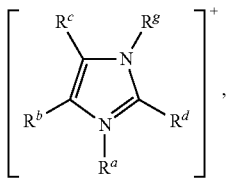

wherein: $R^a$, $R^b$, $R^c$, $R^d$, $R^e$, $R^f$, and $R^g$ are as defined in claim 10, or a cationic species selected from:

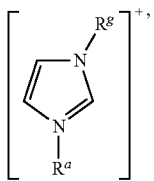

wherein: $R^a$ and $R^g$ are as defined in claim 10.

12. A process according to claim 9, wherein [Cat$^+$] is selected from the group consisting of:

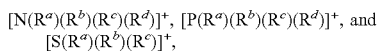

wherein: $R^a$, $R^b$, $R^c$, and $R^d$ are each independently selected from a $C_1$ to $C_{20}$, straight chain or branched alkyl group, a $C_3$ to $C_8$ cycloalkyl group, or a $C_6$ to $C_{10}$ aryl group; and wherein said alkyl, cycloalkyl or aryl groups are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, $C_7$ to $C_{10}$ alkaryl, $C_7$ to $C_{10}$ aralkyl, —CN, —OH, —SH, —NO$_2$, —CO$_2$R$^x$, —OC(O)R$^x$, —C(O)R$^x$, —C(S)R$^x$, —CS$_2$R$^x$, —SC(S)R$^x$, —S(O)($C_1$ to $C_6$)alkyl, —S(O)O($C_1$ to $C_6$)alkyl, —OS(O)($C_1$ to $C_6$)alkyl, —S($C_1$ to $C_6$)alkyl, —S—S($C_1$ to $C_6$ alkyl), —NR$^x$C(O)NR$^y$R$^z$, —NR$^x$C(O)OR$^y$, —OC(O)NR$^y$R$^z$, —NR$^x$C(S)OR$^y$, —OC(S)NR$^y$R$^z$, —NR$^x$C(S)SR$^y$, —SC(S)NR$^y$R$^z$, —NR$^x$C(S)NR$^y$R$^z$, —C(O)NR$^y$R$^z$, —C(S)NR$^y$R$^z$, —NR$^y$R$^z$, or a heterocyclic group, wherein R$^x$, R$^y$ and R$^z$ are independently selected from hydrogen or $C_1$ to $C_6$ alkyl, and wherein one of R$^a$, R$^b$, R$^c$, and R$^d$ may also be hydrogen.

13. A process according to claim 9, wherein [Cat$^+$] is selected from the group consisting of:

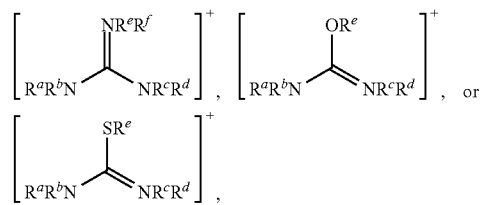

wherein: $R^a$, $R^b$, $R^c$, $R^d$, $R^e$, and $R^f$ are each independently selected from hydrogen, a $C_1$ to $C_{20}$, straight chain or branched alkyl group, a $C_3$ to $C_8$ cycloalkyl group, or a $C_6$ to $C_{10}$ aryl group, or any two of $R^b$, $R^c$, $R^d$, $R^e$ and $R^f$ attached to adjacent carbon atoms form a methylene chain —$(CH_2)_q$— wherein q is from 3 to 6; and wherein said alkyl, cycloalkyl or aryl groups or said methylene chain are unsubstituted or may be substituted by one to three groups selected from: $C_1$ to $C_6$ alkoxy, $C_2$ to $C_{12}$ alkoxyalkoxy, $C_3$ to $C_8$ cycloalkyl, $C_6$ to $C_{10}$ aryl, $C_7$ to $C_{10}$ alkaryl, $C_7$ to $C_{10}$ aralkyl, CN, OH, SH, NO$_2$, CO$_2$R$^x$, OC(O)R$^x$, C(O)Rx, C(S)R$^x$, CS$_2$R$^x$, SC(S)R$^x$, S(O)($C_1$ to $C_6$)alkyl, S(O)O($C_1$ to C$^6$)alkyl, OS(O)($C_1$ to $C_6$)alkyl, S($C_1$ to $C_6$)alkyl, S—S ($C_1$ to $C_6$ alkyl), NR$^x$C(O)NR$^y$R$^z$, NR$^x$C(O)OR$^y$, OC(O)NR$^y$R$^z$, NR$^x$C(S)OR$^y$, OC(S)NR$^y$R$^z$, NR$^x$C(S) SR$^y$, SC(S)NR$^y$R$^z$, NR$^x$C(S)NR$^y$R$^z$, C(O)NR$^y$R$^z$, C(S) NR$^y$R$^z$, NR$^y$R$^z$, or a heterocyclic group, wherein R$^x$, R$^y$ and R$^z$ are independently selected from hydrogen or $C_1$ to $C_6$ alkyl.

14. A process according to claim 1, wherein [X$^-$] comprises an anion selected from halides, perhalides, pseudohalides, sulphates, sulphites, sulfonates, sulfonimides, phosphates, phosphites, phosphonates, methides, borates, carboxylates, azolates, carbonates, carbamates, thiophosphates, thiocarboxylates, thiocarbamates, thiocarbonates, xanthates, thiosulfonates, thiosulfates, nitrate, nitrite, perchlorate, halometallates, amino acids and borates.

15. A process according to claim 14, wherein [X$^-$] comprises one or more anions selected from [F]$^-$, [Cl]$^-$, [Br]$^-$, [I]$^-$, [I$_3$]$^-$, [I$_2$Br]$^-$, [IBr$_2$]$^-$, [Br$_3$]$^-$, [Br$_2$Cl]$^-$, [BrCl$_2$]$^-$, [ICl$_2$]$^-$, [I$_2$Cl]$^-$, [Cl$_3$]$^-$, [N$_3$]$^-$, [NCS]$^-$, [NCSe]$^-$, [NCO]$^-$, [CN]$^-$, [HSO$_4$]$^-$, [SO$_4$]$^{2-}$, [R$^2$OSO$_2$O]$^-$, [HSO$_3$]$^-$, [SO$_3$]$^{2-}$, [R$^2$OSO$_2$]$^-$, [RSO$_2$O]$^-$, [(RISO$_2$)$_2$N]$^-$, [H$_2$PO$_4$]$^-$, [HPO$_4$]$^{2-}$, [PO$_4$]$^{3-}$, [R$^2$OPO$_3$]$^{2-}$, [(R$^2$O)$_2$PO$_2$]$^-$, [H$_2$PO$_3$]$^-$, [HPO$_3$]$^{2-}$, [R$^2$OPO$_2$]$^{2-}$, [(R$^2$O)$_2$PO]$^-$, [R$^1$PO$_3$]$^{2-}$, [R$^1$P(O) (OR$^2$)O]$^-$, [(R$^1$SO$_2$)$_3$C]$^-$, [bisoxalatoborate], [bismalonato-borate], [R$^2$CO$_2$]$^-$, [3,5-dinitro-1,2,4-triazolate], [4-nitro-1,2,3-triazolate], [2,4-dinitroimidazolate], [4,5-dinitroimidazolate], [4,5-dicyano-imidazolate],

[4-nitroimidazolate], [tetrazolate], $[R^2OCS_2]^-$, $[R^2_2NCS_2]^-$, $[R^1CS_2]^-$, $[(R^2O)_2PS_2]^-$, $[RS(O)_2S]^-$, $[ROS(O)_2S]^-$, $[NO_3]^-$ and $[NO_2]^-$, wherein: $R^1$ and $R^2$ are independently selected from the group consisting of $C_1$-$C_{10}$ alkyl, $C_6$ aryl, $C_1$-$C_{10}$ alkyl($C_6$)aryl, and $C_6$ aryl($C_1$-$C_{10}$)alkyl each of which may be substituted by one or more groups selected from: fluoro, chloro, bromo, iodo, $C_1$ to $C_6$ alkoxy, $C_2$ to $C_{12}$ alkoxyalkoxy, $C_3$ to $C_8$ cycloalkyl, $C_6$ to $C_{10}$ aryl, $C_7$ to $C_{10}$ alkaryl, $C_7$ to $C_{10}$ aralkyl, —CN, —OH, —SH, —NO$_2$, —CO$_2$R$^x$, —OC(O)R$^x$, —C(O)R$^x$, —C(S)R$^x$, —CS$_2$R$^x$, —SC(S)R$^x$, —S(O)($C_1$ to $C_6$)alkyl, —S(O)O($C_1$ to $C_6$)alkyl, —OS(O)($C_1$ to $C_6$)alkyl, —S($C_1$ to $C_6$)alkyl, —S—S($C_1$ to $C_6$ alkyl), —NR$^x$C(O)NR$^y$R$^z$, —NR$^x$C(O)OR$^y$, —OC(O)NR$^y$R, —NR$^x$C(S)OR$^y$, —OC(S)NR$^y$R$^z$, —NR$^x$C(S)SR$^y$, —SC(S)NR$^y$R$^z$, —NR$^x$C(S)NR$^y$R$^z$, —C(O)NRR$^z$, —C(S)NR$^y$R$^z$, —NR$^y$R$^z$, or a heterocyclic group, wherein R$^x$, R$^y$ and R$^z$ are independently selected from hydrogen or $C_1$ to $C_6$ alkyl, and wherein $R^1$ may also be fluorine, chlorine, bromine or iodine.

16. A process according to claim 12, wherein [X$^-$] comprises or consists of one or more anions selected from: [F]$^-$, [Cl]$^-$, [Br]$^-$, and [I]$^-$; or [X$^-$] comprises one or more anions selected from: [N$_3$]$^-$, [NCS]$^-$, [NCSe]$^-$, [NCO]$^-$, and [CN]$^-$; or [X$^-$] comprises one or more anions selected from: [HCO$_2$]$^-$, [MeCO$_2$]$^-$, [EtCO$_2$]$^-$, [CH$_2$(OH)CO$_2$]$^-$, [CH$_3$CH(OH)CH$_2$CO$_2$]$^-$, and [PhCO$_2$]$^-$; or [X$^-$] comprises [SO$_4$]$^{2-}$, [Br]$^-$, and [I].

17. A process according to claim 1, wherein the molar ratio of [Cat$^+$] and [M$^+$] in the ionic liquid is in the range of from 10:1 to 1:2, or in the range of from 2:1 to 1:1.

18. A process according to claim 1, wherein the ionic liquid is prepared by adding a salt of the metal cation [M$^+$] to an ionic liquid having the formula [Cat$^+$][X$^-$], wherein [Cat$^+$] and [X$^-$] are as defined in claim 1.

19. A process according to claim 1, wherein the metal cation [M$^+$] is combined with at least one ligand to form a coordination complex, and wherein the coordination complex has the formula:

$$[(M^{x+})_n(L^{y-})_m]^{(nx-my)}$$

wherein: each $M^{x+}$ independently represents a metal ion [M$^+$] as defined in claim 1, having a charge of x+;
each $L^{y-}$ independently represents a ligand having a charge of y−;
n is 1, 2 or 3;
m is 2, 3, 4, 5, 6, 7 or 8;
x is 2, 3, 4, 5 or 6; and
y is 0, 1, 2 or 3.

20. A process according to claim 19, wherein each $L^{y-}$ is an anionic species independently selected from [X−], [O$^{2-}$] and [S$^{2-}$], wherein [X$^-$] comprises an anion selected from halides, perhalides, pseudohalides, sulphates, sulphites, sulfonates, sulfonimides, phosphates, phosphites, phosphonates, methides, borates, carboxylates, azolates, carbonates, carbamates, thiophosphates, thiocarboxylates, thiocarbamates, thiocarbonates, xanthates, thiosulfonates, thiosulfates, nitrate, nitrite, perchlorate, halometallates, amino acids and borates.

21. A process according to claim 19, wherein each $L^{y-}$ is an anionic species independently selected from [F]$^-$, [Cl]$^-$, [Br]$^-$, [I]$^-$, [N$_3$]$^-$, [NCS]$^-$, [NCSe]$^-$, [NCO]$^-$, [CN]$^-$, [R$^2$CO$_2$]$^-$, [O$^{2-}$] and [S$^{2-}$], wherein $R^2$ is independently selected from the group consisting of $C_1$-$C_{10}$ alkyl, $C_6$ aryl, $C_1$-$C_{10}$ alkyl($C_6$)aryl, and $C_6$ aryl($C_1$-$C_{10}$)alkyl each of which may be substituted by one or more groups selected from: fluoro, chloro, bromo, iodo, $C_1$ to $C_6$ alkoxy, $C_2$ to $C_{12}$ alkoxyalkoxy, $C_3$ to $C_8$ cycloalkyl, $C_6$ to $C_{10}$ aryl, $C_7$ to $C_{10}$ alkaryl, $C_7$ to $C_{10}$ aralkyl, —CN, —OH, —SH, —NO$_2$, —CO$_2$R$^x$, —OC(O)R$^x$, —C(O)R$^x$, —C(S)R$^x$, —CS$_2$R$^x$, —SC(S)R$^x$, —S(O)($C_1$ to $C_6$)alkyl, —S(O)O($C_1$ to $C_6$)alkyl, —OS(O)($C_1$ to $C_6$)alkyl, —S($C_1$ to $C_6$)alkyl, —S—S($C_1$ to $C_6$ alkyl), —NR$^x$C(O)NR$^y$R$^z$, —NR$^x$C(O)OR$^y$, —OC(O)NR$^y$R$^z$, —NR$^x$C(S)OR$^y$, —OC(S)NR$^y$R$^z$, —NR$^x$C(S)SR$^y$, —SC(S)NR$^y$R$^z$, —NR$^x$C(S)NR$^y$R$^z$, —C(O)NR$^y$R$^z$, —C(S)NR$y$R$^z$, —NR$^y$R$^z$, or a heterocyclic group.

22. A process according to claim 19, wherein $[(M^{x+})_n(L^{y-})_m]^{(nx-my)}$ represents a metallate anion, wherein the metallate anion is selected from [FeCl$_4$]$^-$, [CuCl$_4$]$^{2-}$, [Cu$_2$Cl$_6$]$^{2-}$ and [MoS$_4$]$^{2-}$.

23. A process according to claim 1, wherein the ionic liquid is immiscible with the mercury-containing hydrocarbon fluid feed and the hydrocarbon fluid product.

24. A process according to claim 1, wherein the ionic liquid is immobilised on a solid support material.

25. A process according to claim 1, wherein the ionic liquid and the mercury-containing hydrocarbon fluid feed are contacted in a volume ratio of from 1:1 to 1:10,000.

26. A process according to claim 1, wherein 1 to 10,000 moles of ionic liquid are contacted with the mercury-containing hydrocarbon fluid feed per mole of the mercury in the mercury-containing hydrocarbon fluid feed.

27. A process for the removal of mercury from a mercury-containing hydrocarbon fluid feed, the process comprising the steps of:
(i) contacting the mercury-containing hydrocarbon fluid feed with an ionic liquid immobilised on a solid support material, where the ionic liquid has the formula:

[Cat$^+$][M$^+$][X]

wherein: [Cat $^+$] represents one or more organic cationic species,
[M$^+$] represents one or more metal cations selected from transition metal cations having an oxidation state of +2 or greater,
[X$^-$] represents one or more anionic species;
(ii) separating from the ionic liquid a hydrocarbon fluid product having a reduced mercury content compared to the mercury-containing fluid feed.

28. A process according to claim 27, wherein the ionic liquid has the formula:
[Cat$^+$] [M$^+$] [X$^-$] wherein:
[Cat$^+$] represents one or more organic cationic species,
[M$^+$] represents one or more metal cations having an oxidation state of at least +2 selected from first row transition metal cations, molybdenum cations, iron cations, copper cations, and cobalt cations, and
[X$^-$] represents one or more anionic species.

29. A process according to claim 27, wherein the solid support material comprises a porous support material having a BET surface area of from 10m$^2$·g$^{-1}$ to 3000 m$^2$·g$^{-1}$.

30. A process according to claim 27, wherein the solid support material is selected from silica, alumina, silica-alumina, and activated carbon, and wherein the solid support material is activated carbon.

31. A process according to claim 27, wherein from about 1 to about 50 wt % of ionic liquid is immobilised on the solid support material, based on the total weight of ionic liquid and solid support material.

* * * * *